United States Patent
Yoshizawa et al.

(10) Patent No.: US 10,810,893 B2
(45) Date of Patent: Oct. 20, 2020

(54) CIRCUIT, BASE STATION, METHOD, AND RECORDING MEDIUM

(71) Applicant: Sony Corporation, Tokyo (JP)

(72) Inventors: Atsushi Yoshizawa, Kanagawa (JP); Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/324,573

(22) PCT Filed: Aug. 15, 2017

(86) PCT No.: PCT/JP2017/029407
§ 371 (c)(1),
(2) Date: Feb. 11, 2019

(87) PCT Pub. No.: WO2018/061502
PCT Pub. Date: Apr. 5, 2018

(65) Prior Publication Data
US 2019/0180633 A1 Jun. 13, 2019

(30) Foreign Application Priority Data
Sep. 27, 2016 (JP) .................. 2016-188149

(51) Int. Cl.
*G08G 5/00* (2006.01)
*H04W 4/02* (2018.01)
(Continued)

(52) U.S. Cl.
CPC .......... *G08G 5/0082* (2013.01); *B64C 39/02* (2013.01); *B64D 47/00* (2013.01); *G08G 5/0013* (2013.01);
(Continued)

(58) Field of Classification Search
CPC .............. G08G 5/0013; G08G 5/0082; H04W 36/0058; H04W 36/0088; H04W 36/18;
(Continued)

(56) References Cited

U.S. PATENT DOCUMENTS

| 9,357,552 B1 | 5/2016 | Gauba et al. |
| 2012/0034917 A1 | 2/2012 | Kazmi |

(Continued)

FOREIGN PATENT DOCUMENTS

| EP | 3 419 197 A1 | 7/2017 |
| JP | 2016-109637 A | 6/2016 |

(Continued)

OTHER PUBLICATIONS

Extended Search Report dated Jul. 22, 2019, issued in corresponding European Patent Application No. 17855460.6.
(Continued)

*Primary Examiner* — Orlando Bousono
(74) *Attorney, Agent, or Firm* — Xsensus LLP

(57) ABSTRACT

Circuitry for an aerial vehicle that includes processing circuitry that acquires altitude information indicating a measurement result of altitude of the aerial vehicle, receives a reference signal transmitted from a base station, receives altitude zone setting information transmitted from the base station, the altitude zone setting information being information for setting an altitude zone for classifying a state of the altitude zone of the aerial vehicle, identifies the altitude zone of the aerial vehicle based on the altitude information and the altitude zone setting information, and controls measurement report processing of reporting a measurement report message including reference signal information indicating a measurement result of the reference signal and the altitude information to the base station based on the altitude zone of the aerial vehicle, such that a frequency of transmitting the (Continued)

measurement report message is changed according to the identified altitude zone.

19 Claims, 13 Drawing Sheets

(51) Int. Cl.
| | |
|---|---|
| *H04W 24/10* | (2009.01) |
| *B64D 47/00* | (2006.01) |
| *B64C 39/02* | (2006.01) |
| *H04W 36/00* | (2009.01) |
| *H04W 36/32* | (2009.01) |
| *H04W 36/18* | (2009.01) |

(52) U.S. Cl.
CPC ........... *H04W 4/027* (2013.01); *H04W 24/10* (2013.01); *H04W 36/0058* (2018.08); *H04W 36/0088* (2013.01); *H04W 36/18* (2013.01); *H04W 36/32* (2013.01)

(58) Field of Classification Search
CPC ..... H04W 36/30; H04W 36/32; H04W 4/027; H04W 24/02; H04W 24/10; H04W 48/16; H04W 88/08; B64C 39/02; B64D 47/00
See application file for complete search history.

(56) References Cited

U.S. PATENT DOCUMENTS

| | | |
|---|---|---|
| 2013/0053025 A1 | 2/2013 | Lindoff et al. |
| 2014/0302876 A1* | 10/2014 | Oizumi ................. G04R 20/14 455/456.3 |
| 2016/0029370 A1 | 1/2016 | Hayes et al. |
| 2016/0157165 A1* | 6/2016 | Xie ................... H04W 36/0083 455/434 |
| 2017/0219342 A1* | 8/2017 | Morioka ............... H04W 4/025 |

FOREIGN PATENT DOCUMENTS

| | | |
|---|---|---|
| JP | 2016-170030 A | 9/2016 |
| WO | 2016/007295 A1 | 1/2016 |
| WO | WO 2016/106746 A1 | 7/2016 |

OTHER PUBLICATIONS

3GPP, "Technical Specification Group Services and System Aspects; Feasibility Study on New Services and Markets Technology Enabler—Critical Communication", Stage 1, 3GPP TR 22-862 V14.0.0, Jun. 2016, Release 14, pp. 1-32.
International Search Report dated Nov. 7, 2017 for PCT/JP2017/029407 filed on Aug. 15, 2017, 9 pages including English Translation.

* cited by examiner

CIRCUIT, BASE STATION, METHOD, AND RECORDING MEDIUM

CROSS-REFERENCE TO RELATED APPLICATIONS

The present application is based on PCT filing PCT/JP2017/029407, filed Aug. 15, 2017, and claims priority to 2016-188149, filed in the Japanese Patent Office on Sep. 27, 2016, the entire contents of each of which are being incorporated herein by reference.

TECHNICAL FIELD

The present disclosure relates to a circuit, a base station, a method, and a recording medium.

BACKGROUND ART

In recent years, research and development related to drones have been carried out and are attracting interest. Drones are small unmanned aircraft also known as unmanned aerial vehicles (UAVs). According to the economic reports published by the US Association for Unmanned Vehicle Systems International, the market size of drones was about 82 billion dollars in 2025 only in the US, and 1 hundred thousand new jobs are estimated to be created. Drones can provide products and information using air space which has not been used for any means on land, sea, or air Therefore, drones are also called the industrial revolution of the air and are considered to be important business areas in the future.

In general, drones are assumed to fly while performing wireless communication. Therefore, it is preferable to develop technologies enabling drones to perform stable wireless communication. With regard to wireless communication used by devices of which positions can be changed, many technologies have been developed so far. For example, the following Patent Literature 1 discloses a technology relating to hand-over by a mobile communication terminal on an aircraft which crosses coverages of respective base stations at high speed.

CITATION LIST

Patent Literature

Patent Literature 1: US 2016/0029370A

DISCLOSURE OF INVENTION

Technical Problem

However, wireless communication systems proposed in the foregoing patent literature, or the like, are not designed on the assumption of devices such as drones which can fly freely in 3-dimensional space.

Accordingly, the present disclosure provides a structure of wireless communication for a device which can fly freely in 3-dimensional space.

Solution to Problem

According to the present disclosure, there is provided a circuit including: an acquiring unit configured to acquire altitude information indicating a measurement result of altitude; and a measurement report control unit configured to control measurement report processing of reporting a measurement report message including reference signal information indicating a measurement result of a reference signal transmitted from a base station and the altitude information to the base station on the basis of relationship between the altitude information acquired by the acquiring unit and altitude zone setting information.

In addition, according to the present disclosure, there is provided a base station including: a reference signal transmitting unit configured to transmit a reference signal; and a notification unit configured to notify a terminal device of altitude zone setting information, the terminal device controlling measurement report processing of reporting a measurement report message including reference signal information indicating a measurement result of the reference signal and altitude information on the basis of relationship between the altitude information indicating a measurement result of altitude and the altitude zone setting information.

In addition, according to the present disclosure, there is provided a method including: acquiring altitude information indicating a measurement result of altitude; and controlling, by a processor, measurement report processing of reporting a measurement report message including reference signal information indicating a measurement result of a reference signal transmitted from a base station and the altitude information to the base station on the basis of relationship between the acquired altitude information and altitude zone setting information.

In addition, according to the present disclosure, there is provided a method including: transmitting a reference signal; and notifying, by a processor, a terminal device of altitude zone setting information, the terminal device controlling measurement report processing of reporting a measurement report message including reference signal information indicating a measurement result of the reference signal and altitude information on the basis of relationship between the altitude information indicating a measurement result of altitude and the altitude zone setting information.

In addition, according to the present disclosure, there is provided a recording medium having a program recorded thereon, the program causing a computer to function as: an acquiring unit configured to acquire altitude information indicating a measurement result of altitude; and a measurement report control unit configured to control measurement report processing of reporting a measurement report message including reference signal information indicating a measurement result of a reference signal transmitted from a base station and the altitude information to the base station on the basis of relationship between the altitude information acquired by the acquiring unit and altitude zone setting information.

In addition, according to the present disclosure, there is provided a recording medium having a program recorded thereon, the program causing a computer to function as: a reference signal transmitting unit configured to transmit a reference signal; and a notification unit configured to notify a terminal device of altitude zone setting information, the terminal device controlling measurement report processing of reporting a measurement report message including reference signal information indicating a measurement result of the reference signal and altitude information on the basis of relationship between the altitude information indicating a measurement result of altitude and the altitude zone setting information.

Advantageous Effects of Invention

According to the present disclosure, as described above, it is possible to provide a structure of wireless communication for a device which can fly freely in 3-dimensional space. Note that the effects described above are not necessarily limitative. With or in the place of the above effects, there may be achieved any one of the effects described in this specification or other effects that may be grasped from this specification.

DISCLOSURE OF INVENTION

Figure 1:
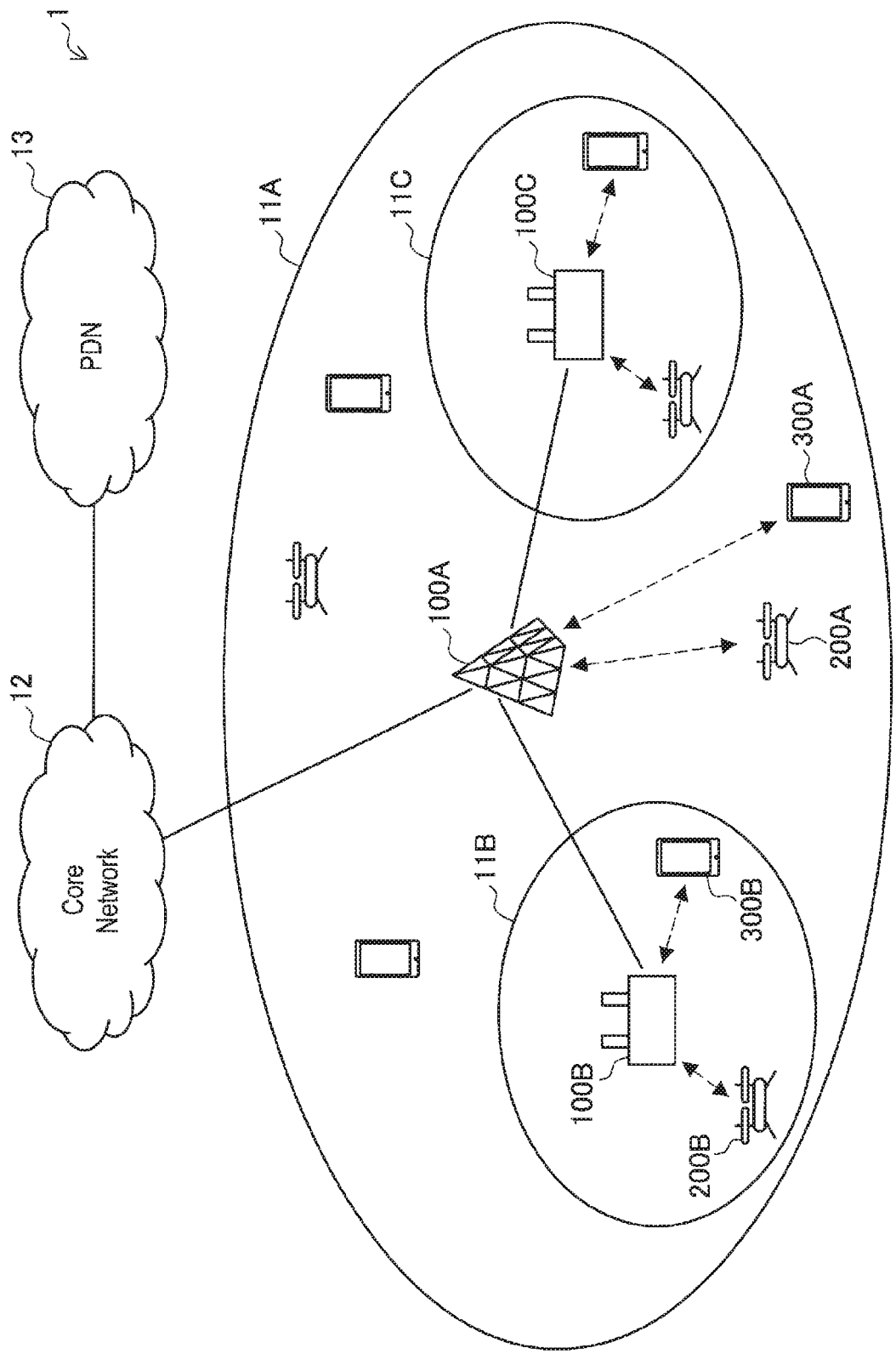
FIG. 1 is an explanatory diagram illustrating an example of a configuration of a system according to the present embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the present specification and the drawings, different letters are suffixed to the same reference numerals to distinguish elements Which have substantially the same functional configuration. For example, a plurality of elements which has substantially the same functional configuration is distinguished such as base stations 100A, 100B, and 100C, as necessary. Here, in a case in which it is not necessary to particularly distinguish a plurality of elements which has substantially the same functional configuration, only the same reference numeral is given. For example, in a case in which it is not necessary to particularly distinguish base stations 100A, 100B, and 100C, the base stations 100A, 100B, and 100C are simply referred to as the base stations 100.

Note that description will be provided in the following order.

1. Introduction
1.1. Use cases of drone
1.2. Wireless communication by drone
1.3. General issues related to drone
1.4. System configuration example
1.5. Regulations
1.6. Hand-over
2. Configuration example of each device
2.1. Configuration example of base station
2.2. Configuration example of drone
3. Technical features
4. Application examples
5. Conclusion

1. INTRODUCTION

<1.1. Use Cases of Drone>

Various use cases of a drone are considered. Hereinafter, examples of representative use cases will be described.

Entertainment

For example, a use case in which a bird's-eye view photo, a moving image, or the like, is captured by mounting a camera on a drone is considered. In recent years, it has become possible to easily perform photographing from viewpoint at which photographing was difficult before, such as dynamic photographing of sports events, or the like, from the ground.

Transportation

For example, a use case in which luggage is transported with a drone is considered. There is already a movement for starting service introduction.

Public Safety

For example, a use case such as surveillance, criminal tracking, or the like, is considered. Previously, there was also a movement for starting service introduction.

Informative

For example, a use case in which information is provided using a drone is considered. Research and development of a drone base station which is a drone operating as a base station are already being carried out. The drone base station can provide a wireless service to an area in which it is difficult to build an Internet circuit by providing the wireless service from the sky.

Sensing

For example, a use case of measurement performed using a drone is considered. Since measurement previously performed by humans can now also be performed collectively by a drone, efficient measurement can be performed.

Worker

For example, a use case in which a drone is used as a labor force is considered. For example, utilization of a drone for pesticide spraying or pollination in a variety of areas of the agricultural industry is expected.

Maintenance

For example, a use case in which maintenance is performed using a drone is considered. By using a drone, it is possible to perform maintenance of a location such as the back of a bridge in which it is difficult for humans to perform validation.

<1.2. Wireless Communication by Drone>

Utilization of a drone in the various cases has been examined above. In order to realize such use cases, various technical requests are imposed on the drone. Of the technical requests, communication can be exemplified particularly as an important request. Since a drone flies freely in 3-dimensional space, using wired communication is unrealistic and using wireless communication is assumed. Note that control (that is, remote manipulation) of a drone, supply of information from a drone, and the like, are considered as purposes of the wireless communication.

Communication by a drone is also referred to as drone to X (D2X) in some cases. Communication partners of a drone in the D2X communication are considered to be, for example, another drone, a cellular base station, a Wi-Fi (registered trademark) access point, a television (TV) tower, a satellite, a road side unit (RSU), and a human (or a device carried by a human), and the like. A drone can be remotely manipulated via device to device (D2D) communication with a device carried by a human. Further, a drone can also be connected to a cellular system or Wi-Fi for communication. In order to further broaden coverage, a drone may be a connected to a network in which a broadcast system such as TV is used or a network in which satellite communication is used, for communication. In this way, forming various communication links in a drone is considered.

<1.3. General Issues Related to Drone>

In general, in cellular communication, in order for a base station device and a terminal device to efficiently perform wireless communication, the base station device preferably controls radio resources efficiently. Therefore, in LTE, or the like, of the related art, the terminal device reports (that is, feeds back) measurement information of a transmission path with the base station device and/or terminal device state information to the base station device. Then, the base station device controls the radio resources on the basis of the information reported from the terminal device.

However, a structure for the feedback control performed in the past cellular communication has been designed on the premise that a terminal device is used on the ground or in a building, that is, a terminal device is used in 2-dimensional space. In other words, the structure for the feedback control performed in the past cellular communication may not be said to be appropriate for a drone which flies freely in 3-dimensional space. Therefore, it is desirable that a structure for cellular communication is expanded for a drone.

<1.4. System Configuration Example>

Hereinafter, an example of a configuration of a system according to the present embodiment will be described with reference to FIG. 1.

FIG. 1 is an explanatory diagram illustrating an example of a configuration of a system according to the present embodiment. As illustrated in FIG. 1, the system 1 according to the present embodiment includes a base station 100, a terminal device 200 and a terminal device 300.

A base station 100A is a macro cell base station which operates a macro cell 11A. The macro cell base station 100A is connected to a core network 12. The core network 12 is connected to a packet data network (PDN) 13 via a gateway device (not illustrated). The macro cell 11A may be operated in accordance with an arbitrary wireless communication scheme such as, for example, long term evolution (LTE), LTE-advanced (LTE-A) and 5G. Note that, it is assumed that 5G includes new radio (NR), new radio access technology (NRAT), and further evolved universal terrestrial radio access (FEUTRA).

Base stations 100B and 100C are small cell base stations which respectively operate a small cell 11B and a small cell 11C. The small cell base stations 100B and 100C are connected to the macro cell base station 100A. The small cells 119 and 11C may be operated in accordance with an arbitrary wireless communication scheme such as, for example, LTE, LTE-A and 5G.

The terminal devices 200 and 300 are devices which perform wireless communication by being connected to cells operated by the base station 100. As illustrated in FIG. 1, the terminal device 200 is a drone which flies freely in 3-dimensional space. Further, the terminal device 300 is a device such as a smartphone which is assumed to move on a 2-dimensional plane. In the following description, to distinguish between the terminal device 200 and the terminal device 300, the terminal device 200 will be also referred to as a drone 200. The drone 200 can transmit and receive data in real time in a broad coverage provided by, for example, cellular communication and receive control for autonomous flight by performing cellular communication. In an example illustrated in FIG. 1, a drone 200A and a terminal device 300A are connected to the macro cell 11A provided by the macro cell base station 100A, and a drone 200B and a terminal device 300B are connected to the small cell 11B provided by the small cell base station 100B.

Note that, in the following description, in the case where it is not particularly necessary to distinguish between the macro cell base station 100 and the small cell base station 100, these are collectively referred to as the base station 100.

<1.5. Regulations>

It is assumed that regulations in accordance with altitude of flight are imposed on a drone.

The drone can stably and autonomously fly through advanced information processing using information input from a plurality of sensors such as a global navigation satellite system (GNSS), a gyro sensor and an imaging element. Therefore, the drone can realize highly automated flight or flight by efficient remote control for flight schedule from a place of departure to a destination determined in advance. The drone can have various forms in accordance with various kinds of application. For example, in the case where the drone is a helicopter-type drone, the drone has a variety of flight patterns.

The drone has a feature that it has an extremely high degree of freedom of existing with respect to altitude (for example, altitude above the ground), unlike with a terminal device in related art such as a smartphone used by a person. Further, the drone has a feature that it has extremely high moving speed in a vertical direction. For example, it is considered that, while the drone exists on the ground at a certain time point, after flight is started, the drone reaches a height of several tens of meters in the air after mere several seconds by steep climbing. Further, it is also considered that flight of a drone terminal is switched to level flight after climbing, and the drone reaches a point several hundreds of meters away after several tens of seconds, and, then, lowers its altitude to return to the height of the ground at a remote location.

There is a high possibility that certain legal restrictions may be imposed on a drone whose position varyingly changes with respect to altitude at extremely high speed, for the purpose of securing safety in the future. Currently, governmental institutions and private companies are proposing legal restrictions. An example of possible legal restrictions will be described with reference to FIG. 2.

Figure 2:
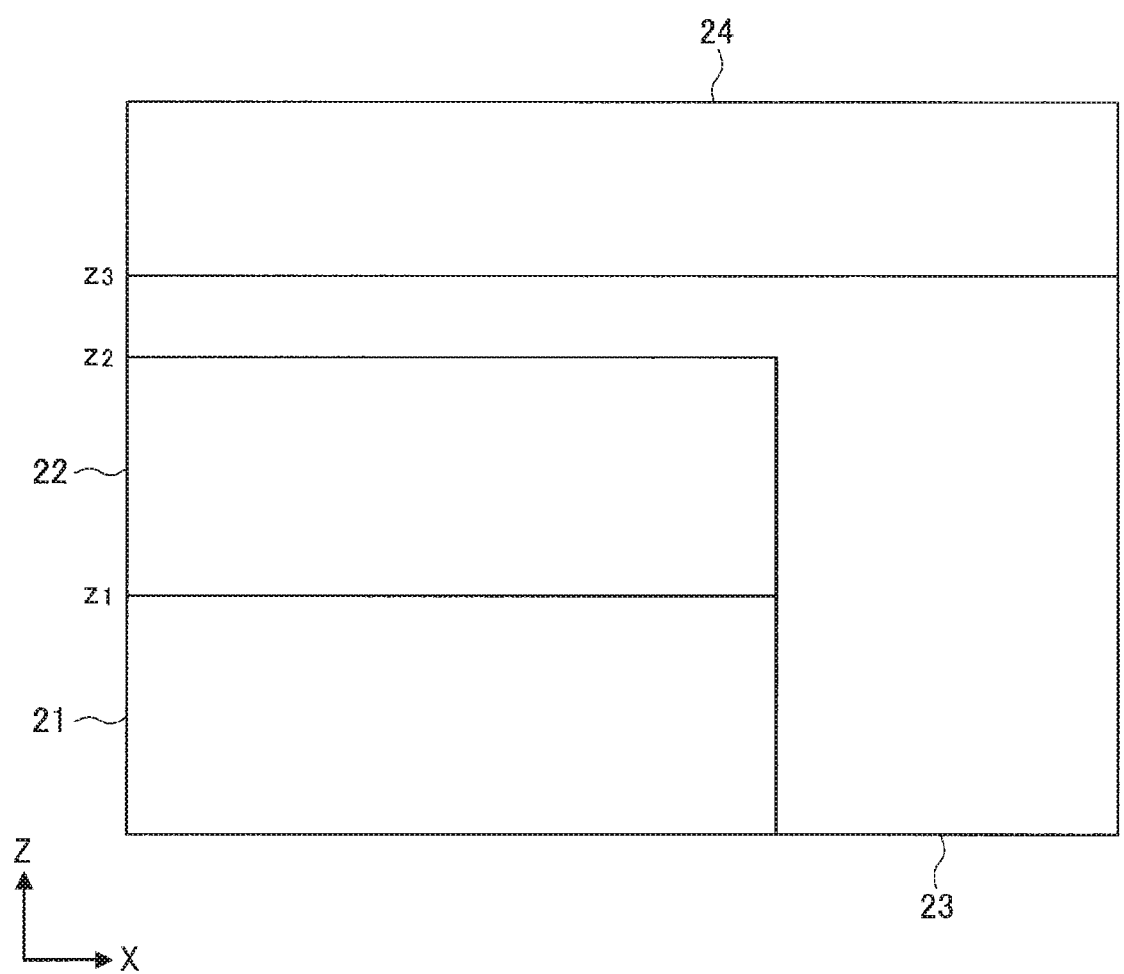
FIG. 2 is an explanatory diagram illustrating an example of legal restrictions with respect to a drone.

FIG. 2 is an explanatory diagram illustrating an example of the legal restrictions with respect to the drone. An X axis direction in FIG. 2 means a horizontal direction, and a Z axis direction means a height direction. As illustrated in FIG. 2, it is considered that air space may be divided into a plurality of regions of air space, and legal restrictions may be imposed for each divided region of air space. The air space can be divided in accordance with, for example, height and/or a type of building on the ground. Air space 21 is air space until altitude $z_1$, and, for example, flight at low speed is permitted. Air space 22 is air space from altitude $z_1$ to altitude $z_2$, and, for example, flight at high speed is permitted. Air space 23 is air space from altitude $z_2$ to altitude $z_3$, which is air space over an area for which requirements for safety are high such as an area of high population density and an airport, and, for example, flight itself is prohibited. Air space 24 is air space higher than altitude $z_3$, and, for example, flight by an authorized drone is permitted.

A user of the drone is required to manage flight of the drone stably and efficiently while complying with such legal restrictions. Further, cellular service providers are required to provide stable and efficient communication environments to drones also in the case where the number of drones which perform cellular communication increases in the future. Further, the cellular service providers are required to prevent degradation of quality of service for terminal devices other than drones.

<1.6. Hand-Over>

Figure 3:
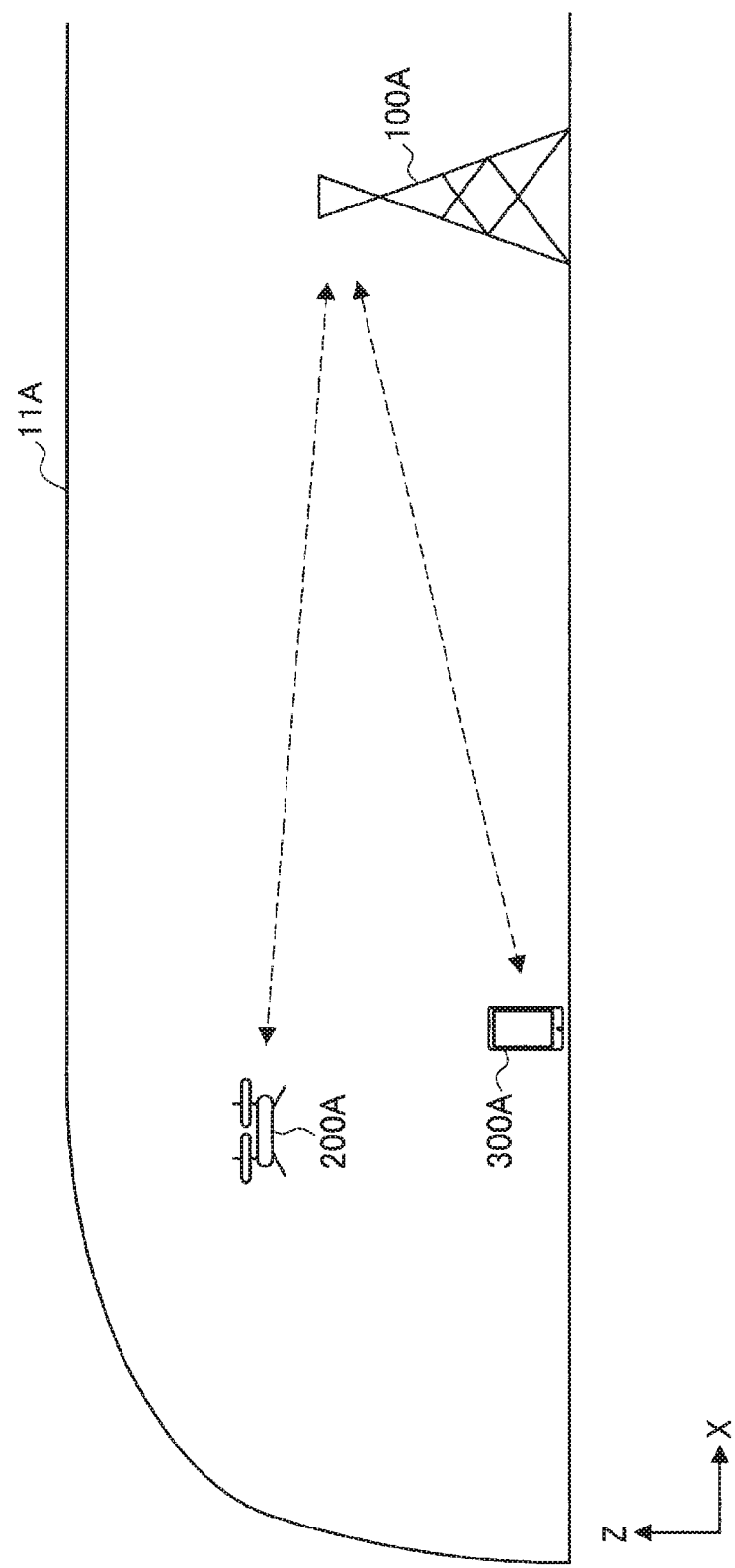
FIG. 3 is an explanatory diagram illustrating an example of wireless communication by a drone.

FIG. 3 is an explanatory diagram illustrating an example of wireless communication by a drone 200. FIG. 3 is an example of a view of the macro cell 11A illustrated in FIG. 1 seen from a horizontal direction, an X axis direction means a horizontal direction, and a Z axis direction means a height direction. Because a drone 200A can move at high speed and in a wide area, the drone 200A can stably perform communication by being connected to the broad macro cell 11A provided by the macro cell base station 100A. In this manner, for the drone 200, cellular in which a communication distance is relatively long is more desirable than a communication scheme such as Wi-Fi in which a communication distance is relatively short, and particularly, connection with a macro cell which is excellent in coverage is desirable.

However, it is assumed that communication by the drone 200 is accompanied by a substantial amount of data communication such as control data for flight and image information captured by the drone 200. Therefore, it is not desirable for the drone 200 to be always connected to the macro cell to perform communication. To improve frequency utilization efficiency of a network, avoid congestion, or the like, if possible, it is desirable that communication is made transition to communication performed by being connected to a small cell. By an operator appropriately utilizing a small cell, it is possible to provide stable data communication at high speed at low altitude while suppressing consumption of relatively expensive resources of a macro cell. Switching between a macro cell and a small cell will be described with reference to FIG. 4.

Figure 4:
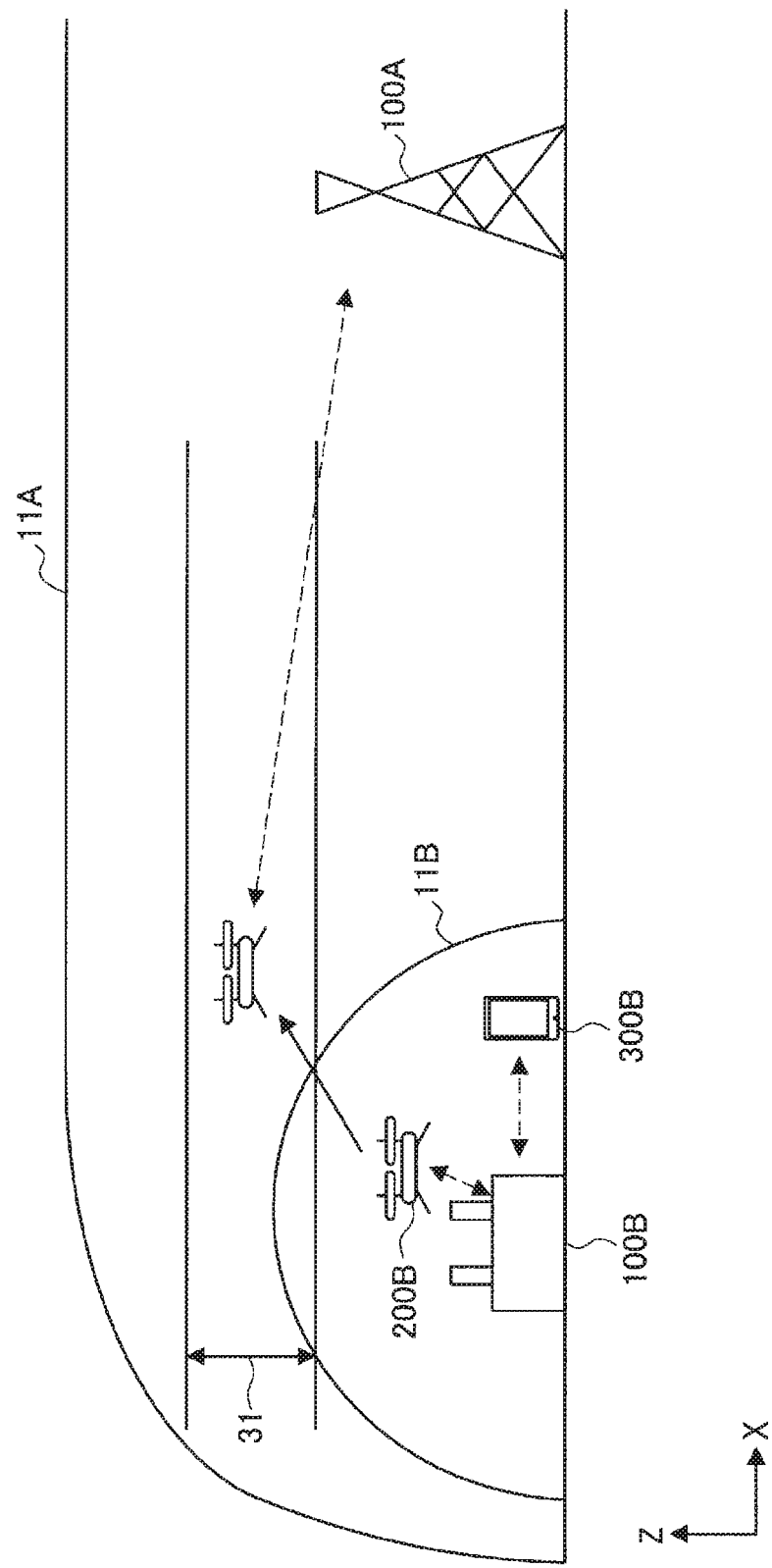
FIG. 4 is an explanatory diagram illustrating an example of wireless communication by a drone.

FIG. 4 is an explanatory diagram illustrating an example of wireless communication by the drone 200. FIG. 4 is an example of a view of the macro cell 11A and the small cell 11B illustrated in FIG. 1 seen from the horizontal direction, an X axis direction means a horizontal direction, and a Z axis direction means a height direction. As illustrated in FIG. 4, in the case where the drone 200B is located (that is, flies) near the ground, it is desirable that the drone 200B is connected to the small cell 11B provided by the small cell base station 100B. Meanwhile, in the case where the drone 200B is located at high altitude, it is desirable that the drone 200B is connected to the macro cell 11A provided by the macro cell base station 100A. By a connection destination being switched in this manner, it is possible to realize both increase in capacity of the small cell to accommodate terminals and stability provided by connection in a broad area by a macro cell.

In this manner, in terms of efficient utilization of radio resources and flight stability of the drone 200, it is desirable that hand-over in association with climbing and descent of the drone 200 is executed.

Here, as described above, it is assumed that regulations regarding flight altitude may be imposed on the drone 200. Then, it is assumed that the drone 200 is used by a flight plan in accordance with a determined rule of flight altitude being programmed in advance on the basis of the regulations. For example, it is assumed that the drone 200 continues to climb after taking off from the ground, and starts level flight at high speed when reaching a predetermined altitude zone (for example, a high-speed flight altitude zone 31).

Concerning this point, in cellular communication in related art, a timing of hand-over based on received signal strength of a reference signal transmitted from the base station is defined. In the case where the drone 200 performs hand-over on the basis of the received signal strength in a similar manner, there can occur a gap between the timing of hand-over based on the received signal strength and a boundary of flight altitude defined by the regulations. This point will be described in detail with reference to FIG. 5 and FIG. 6.

Figure 5:
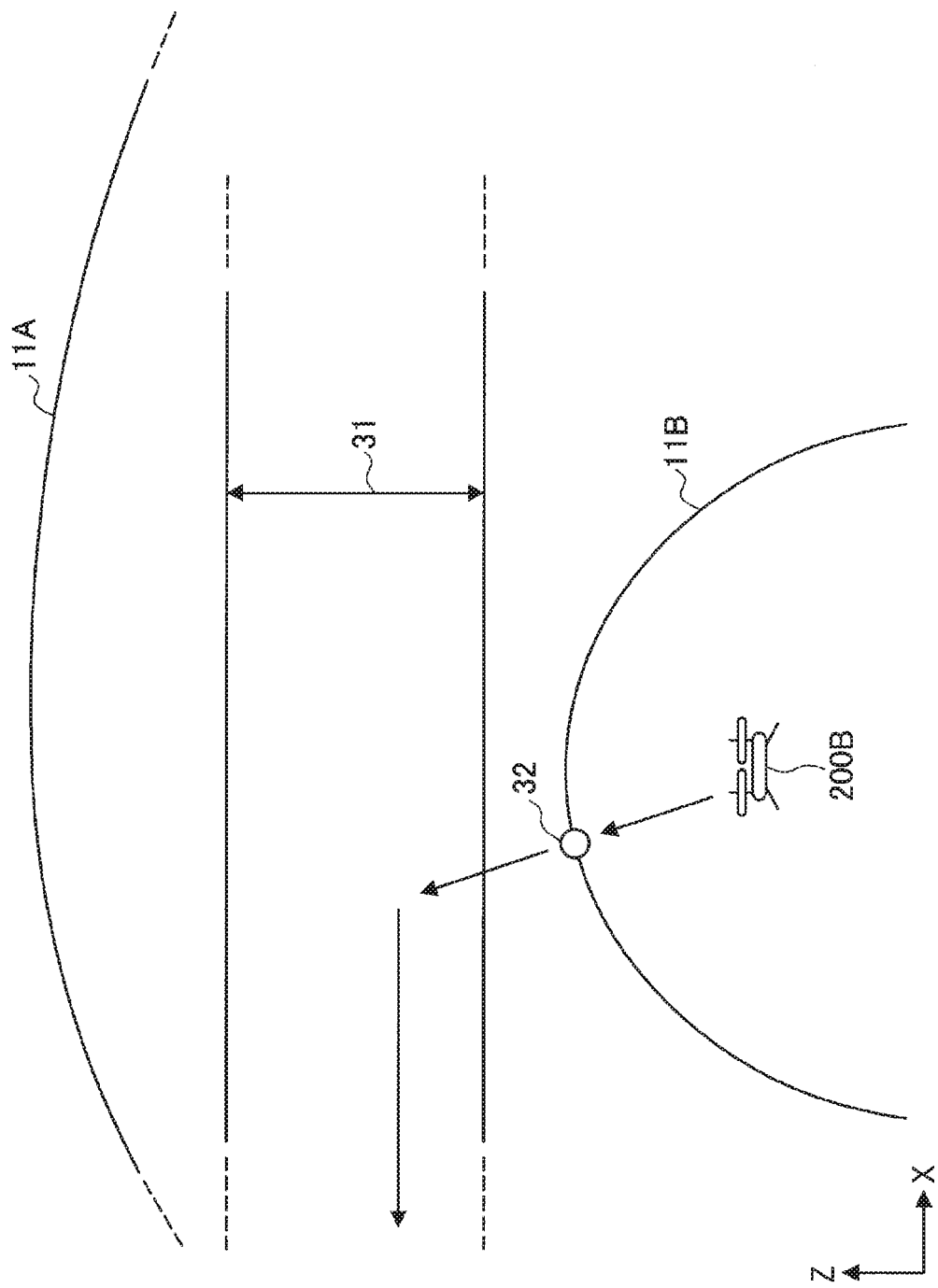
FIG. 5 is an explanatory diagram illustrating an example of wireless communication by a drone.

FIG. 5 is an explanatory diagram illustrating an example of wireless communication by the drone 200. FIG. 5 is an example of a view of the macro cell 11A and the small cell 11B illustrated in FIG. 1 seen from a horizontal direction, an X axis direction means a horizontal direction, and a Z axis direction means a height direction. As illustrated in FIG. 5, there can be a case where an upper limit of the small cell 11B whose boundary is defined with power does not intersect with a lower limit of the high-speed flight altitude zone 31. In this case, the drone 200 hands over to the macro cell 11A at an upper end (for example, a position indicated with a reference numeral 32) of the small cell 11B. Then, if the drone 200 reaches the high-speed flight altitude zone 31, the drone 200 starts high-speed flight in a state where connection with the macro cell 11A is maintained. In this case, connection of the drone 200 transitions to connection with the macro cell 11A before the drone 200 starts high-speed flight. That is, because the drone 200 starts high-speed movement after securing a broad connection coverage in advance, a problem does not particularly occur. Note that the high-speed flight altitude zone 31 can correspond to the air space 22 described above with reference to FIG. 2.

Figure 6:
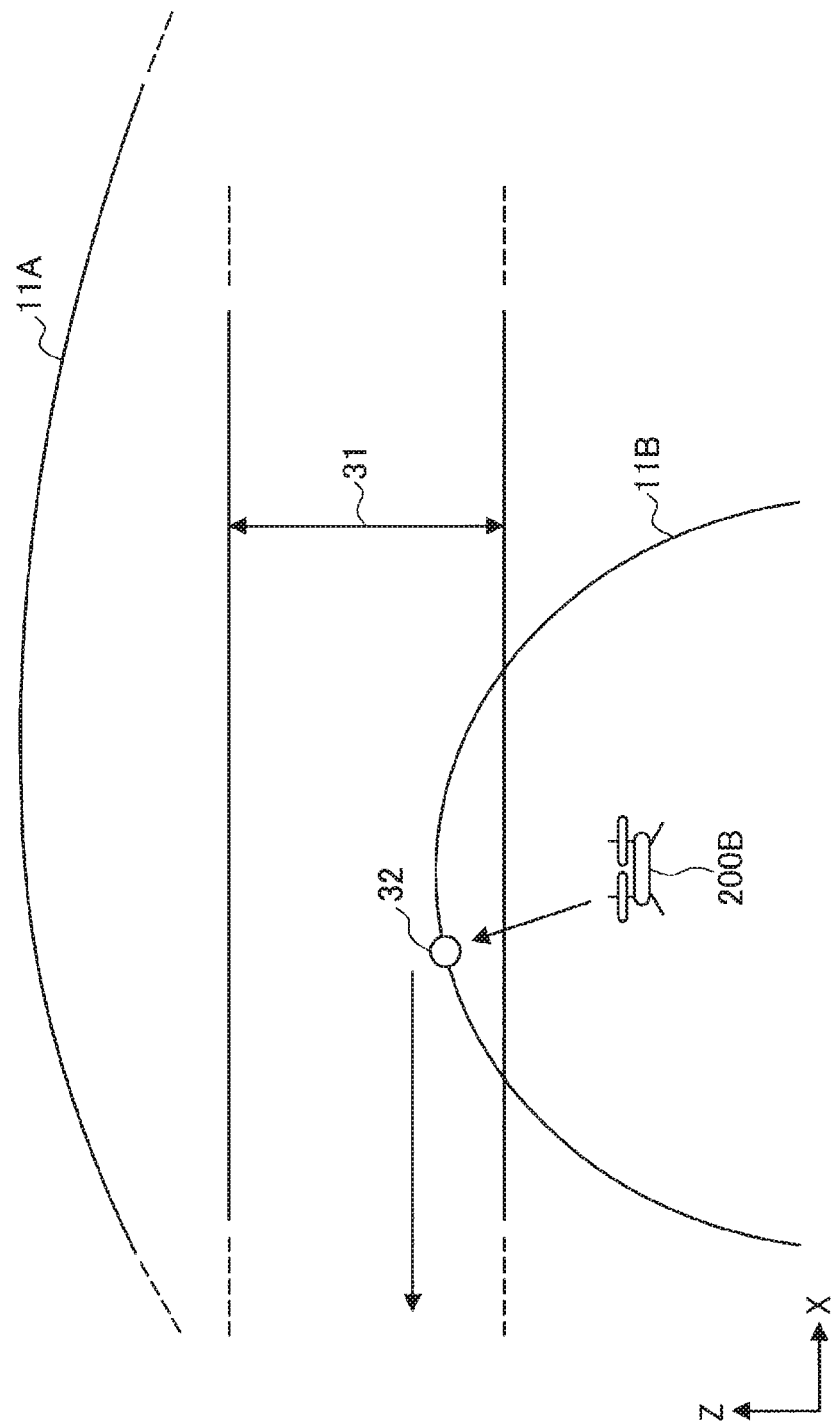
FIG. 6 is an explanatory diagram illustrating an example of wireless communication by a drone.

FIG. 6 is an explanatory diagram illustrating an example of wireless communication by the drone 200. FIG. 6 is an example of a view of the macro cell 11A and the small cell 11B illustrated in FIG. 1 seen from a horizontal direction, an X axis direction means a horizontal direction, and a Z axis direction means a height direction. As illustrated in FIG. 6, there can be a case where an upper limit of the small cell 11B whose boundary is defined with power intersects with the lower limit of the high-speed flight altitude zone 31. In this case, there is a possibility that the drone 200B may start high-speed flight in a state where connection with the small cell 11B is maintained. In this case, the drone 200 tries to hand over to the macro cell 11A at an upper end (for example, a position indicated with a reference numeral 32) of the small cell 11B. Further, there can be also a case where the drone 200 crosses the small cell in a short period of time. In such a case, there is a possibility that the drone 200 exceeds a cell range of the small cell in a short period of time.

It seems that a cell radius of the small cell is set sufficiently small in accordance with the regulations on the drone 200. However, in such a case, strict restrictions are imposed on the cell radius of the small cell, which is not appropriate. Further, it is not realistic to recognize and manage a size of the cell radius in the air.

As in the example illustrated in FIG. 6, if the drone 200 goes out from the cell range of the small cell in a short period of time, there is a possibility that hand-over may be failed due to influence of a time lag from measurement to execution of hand-over. To explain this point, first, hand-over procedure will be described with reference to FIG. 7.

Figure 7:
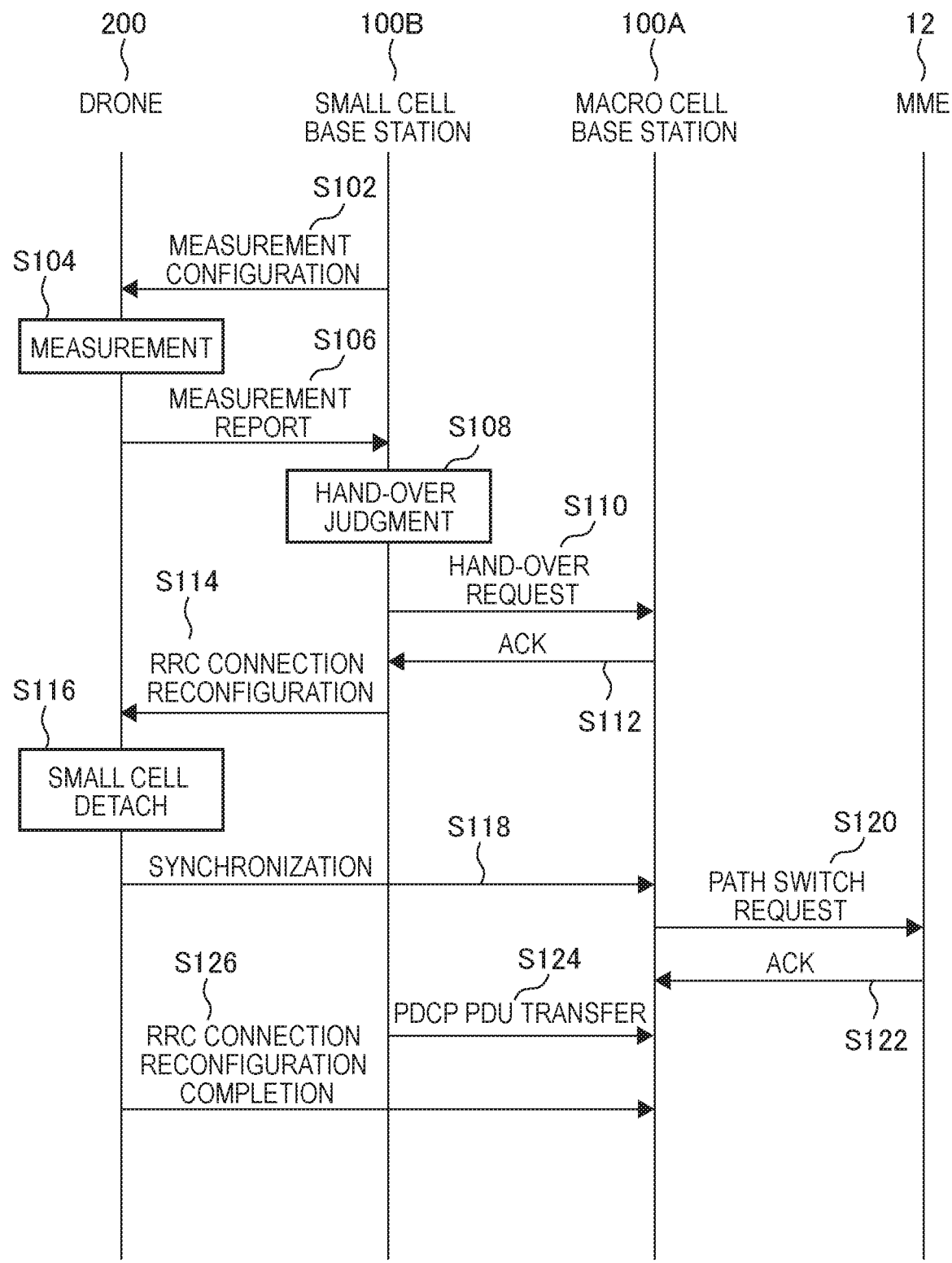
FIG. 7 is a sequence diagram illustrating an example of flow of hand-over procedure executed in the system according to the present embodiment.

FIG. 7 is a sequence diagram illustrating an example of flow of the hand-over procedure to be executed in the system 1 according to the present embodiment. The drone 200, the small cell base station 100B, the macro cell base station 100A and mobility management entity (MME) 12 are involved with the present sequence. Further, it is assumed that the drone 200 is connected to the small cell base station 100B in advance.

As illustrated in FIG. 7, first, the small cell base station 100B transmits a measurement configuration message to the drone 200 (step S102). This measurement configuration message can be transmitted as, for example, radio resource control (RRC) connection reconfiguration message. The drone 200 measures a reference signal transmitted from a surrounding base station on the basis of this measurement configuration message and system information (step S104). Then, the drone 200 transmits a measurement report message including information indicating a measurement result to the small cell base station 100B in the case where predetermined conditions are satisfied (step S106).

Then, the small cell base station 100B judges hand-over on the basis of the received measurement report message (step S108). In the case where it is judged to perform hand-over, the small cell base station 100B transmits a hand-over request message to a target base station (here, the macro cell base station 100A) (step S110). Then, the macro cell base station 100A transmits an ACK signal in response to the received hand-over request message to the small cell base station 100B (step S112). Then, the small cell base station 100B transmits an RRC connection reconfiguration message for giving an instruction of movement of a cell to the drone 200 after receiving the ACK signal (step S114).

Then, the drone 200 performs procedure of detaching from a small cell to which the drone 200 is being connected (step S116) and establishes synchronization with the macro cell base station 100A (step S118). Then, the macro cell base station 100A transmits a path switch request to the MME 12 (step S120) and receives an ACK signal (step S122). Then, the small cell base station 100E transfers packet data convergence protocol (PDCP) packet data unit (PDU) to the macro cell base station 100A. Further, the drone 200 transmits an RRC connection reconfiguration completion message to the macro cell base station 100A (step S126).

Referring to the flow described above, in the hand-over procedure, there is a time lag from when the drone 200 performs measurement until when hand-over is judged and the RRC connection reconfiguration message is received. Therefore, there is a possibility that the drone 200 which is being connected to the small cell exceeds the cell range of the small cell in a short period of time by suddenly starting high-speed flight at a time point at which the drone 200 reaches certain altitude, and thereby fails to receive the RRC connection reconfiguration message. As a result, the drone 200 does not execute hand-over, and, as a result, connection with the small cell base station 100 to which the drone 200 has been connected is interrupted.

In this manner, there is a possibility that, due to a gap between the timing of the hand-over based on the received signal strength and the boundary of the flight altitude defined by the regulations, the drone 200 may fail in hand-over and lose connection.

Concerning circumstances described above, as one of related arts assuming communication between a mobile body which moves in a 3-dimensional manner and a ground station, there is the above-described Patent Literature 1. The above-described Patent Literature 1 discloses a technique of causing a terminal on an aircraft to perform hand-over on the basis of 3-dimensional position information of the aircraft. However, the above-described Patent Literature 1 nowhere studies regulations regarding flight altitude which can be imposed. Therefore, the above-described Patent Literature 1 nowhere studies the above-described gap between the timing of the hand-over based on the received signal strength and the boundary of flight altitude defined by the regulations. While it is effective to perform measurement in advance by a terminal to realize desirable hand-over, the above-described Patent Literature 1 nowhere studies this point. Further, while it is effective to perform measurement in advance by a terminal to realize desirable hand-over, Patent Literature 1 does not study this point.

Therefore, in view of the above-described circumstances, the present embodiment proposes a structure of wireless communication for the drone 200 which flies freely in 3-dimensional space, more specifically, a structure of measurement report for realizing appropriate hand-over.

2. CONFIGURATION EXAMPLE OF EACH DEVICE

<2.1 Configuration Example of Base Station>

Figure 8:
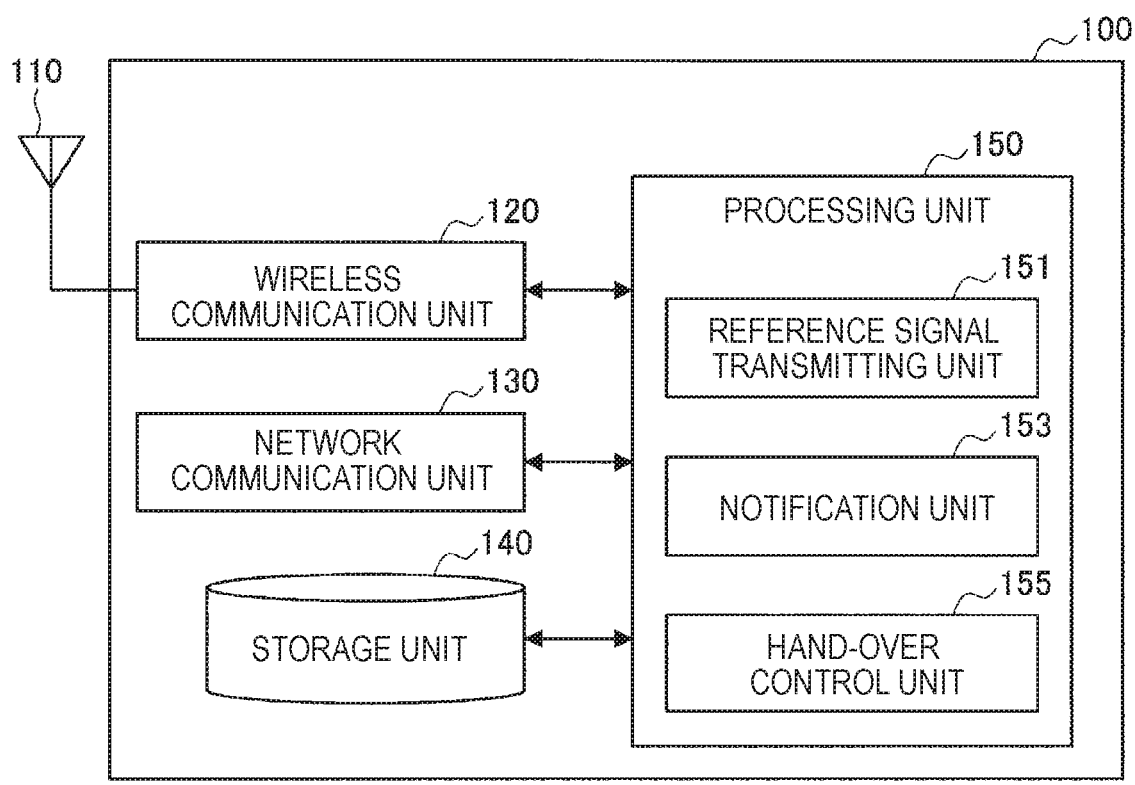
FIG. 8 is a block diagram illustrating an example of a logical configuration of a base station according to the present embodiment.

FIG. 8 is a block diagram illustrating an example of a logical configuration of the base station 100 according to the present embodiment. As illustrated in FIG. 8, the base station 100 includes an antenna unit 110, a wireless communication unit 120, a network communication unit 130, a storage unit 140 and a processing unit 150.

(1) Antenna Unit 110

The antenna unit 110 radiates a signal output from the wireless communication unit 120 to space as a radio wave. Further, the antenna unit 110 converts a radio wave in space into a signal and outputs the signal to the wireless communication unit 120.

(2) Wireless Communication Unit 120

The wireless communication unit 120 transmits and receives signals. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to other nodes, and receives information from other nodes. For example, the above-described other nodes include other base stations and core network nodes.

(4) Storage Unit 140

The storage unit 140 temporarily or permanently stores programs and various kinds of data for operation of the base station 100.

(5) Processing Unit 150

The processing unit 150 provides various functions of the base station 100. The base station 100 operates on the basis of control by the processing unit 150. The processing unit 150 includes a reference signal transmitting unit 151, a notification unit 153 and a hand-over control unit 155. Note that the processing unit 150 can further include constituent elements other than these constituent elements. That is, the processing unit 150 can perform operation other than operation of these constituent elements. Functions of the reference signal transmitting unit 151, the notification unit 153 and the hand-over control unit 155 will be described in detail later.

<2.2. Configuration Example of Drone>

Figure 9:
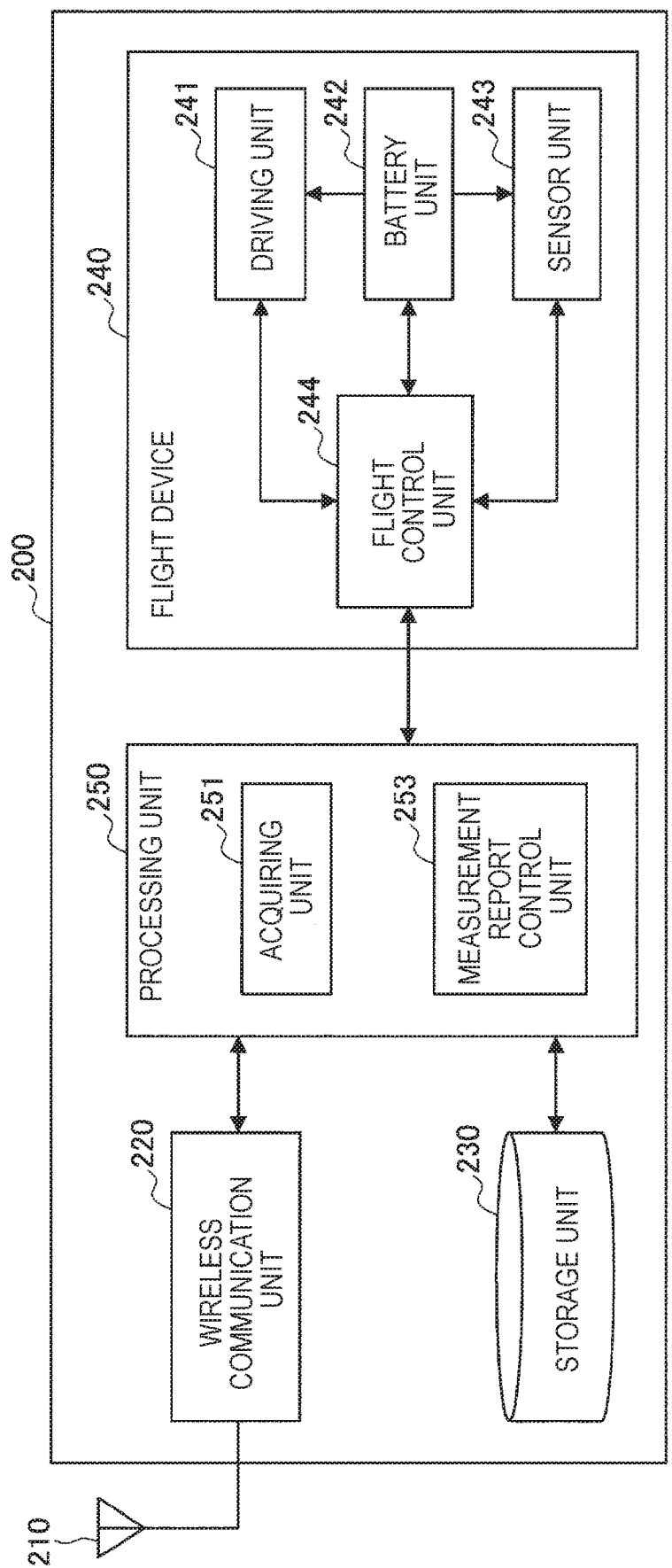
FIG. 9 is a block diagram illustrating an example of a logical configuration of a drone according to the present embodiment.

FIG. 9 is a block diagram illustrating an example of a logical configuration of the drone 200 according to the present embodiment. As illustrated in FIG. 9, the drone 200 according to the present embodiment includes an antenna unit 210, a wireless communication unit 220, a storage unit 230, a flight device 240 and a processing unit 250.

(1) Antenna Unit 210

The antenna unit 210 radiates a signal output from the wireless communication unit 220 to space as a radio wave. Further, the antenna unit 210 converts a radio wave in space into a signal and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various kinds of data for operation of the terminal device 200.

(4) Flight Device 240

The flight device 240 is a device that has a flight ability, that is, can fly. The flight device 240 includes a driving unit 241, a battery unit 242, a sensor unit 243, and a flight control unit 244.

The driving unit 241 performs driving for causing the drone 200 to fly. The driving unit 241 includes, for example, a motor, propeller, a transfer mechanism that transfers power of the motor to the propeller, and the like. The battery unit 242 supplies power to each constituent element of the flight device 240. The sensor unit 243 senses various kinds of information. For example, the sensor unit 243 includes a gyro sensor, an acceleration sensor, a positional information acquisition unit (for example, a signal positioning unit of the global navigation satellite system (GNSS)), an altitude sensor, a remaining battery sensor, a rotational sensor of the motor, and the like. The flight control unit 244 performs control for causing the drone 200 to fly. For example, the flight control unit 244 controls the driving unit 241 on the basis of sensor information obtained from the sensor unit 243 such that the drone 200 is caused to fly.

(5) Processing Unit 250

The processing unit 250 provides various functions of the terminal device 200. The processing unit 250 includes an acquiring unit 251 and a measurement report control unit 253. Note that the processing unit 250 can further include constituent elements other than these constituent elements. That is, the processing unit 250 can perform operation other than operation of these constituent elements. Functions of the acquiring unit 251 and the measurement report control unit 253 will be described in detail later The processing unit 250 is connected to the flight device 240. The processing unit 250 may be realized as a processor, a circuit, an integrated circuit, or the like.

3. TECHNICAL FEATURES (1) Measurement of Reference Signal

The base station 100 (for example, the reference signal transmitting unit 151) transmits a reference signal. The drone 200 (for example, the measurement report control unit 253) then measures the reference signal transmitted from the base station 100 to obtain reference signal information indicating the measurement result. The reference signal information includes information indicating signal quality such as reference signal received power (RSRP) and reference signal received quality (RSRQ) of, for example, a primary cell or an adjacent cell. Such measurement processing is performed also in related art to perform hand-over in LTE.

(2) Altitude Information

The drone 200 (for example, the acquiring unit 251) acquires altitude information indicating a measurement result of altitude. For example, the altitude information can be measured by the sensor unit 243. That is, the drone 200 can acquire the altitude information from the flight device 240. There can be various methods for measuring the altitude information. For example, the altitude information may be measured by the drone 200 radiating an electromagnetic wave such as a radio wave, infrared light and laser light to the ground. Further, the altitude information may be obtained by the GNSS. Further, the altitude information may be estimated from a measurement result of an atmospheric pressure on the basis of relationship between an atmospheric pressure and altitude. Further, the altitude information may be obtained by radio waves transmitted from a plurality of base stations 100 being received.

The drone 200 may further improve accuracy of the altitude information by combining two or more of these measurement methods. Further, the drone 200 may further improve accuracy of the altitude information by correcting the measured altitude information using correction data transmitted from the base station 100, In addition, the altitude information may be measured by other devices. For example, the altitude information may be measured by another drone 200 which flies near the drone 200. Further, the altitude information may be obtained by the plurality of base stations 100 receiving radio waves transmitted from the drone 200, in these cases, the drone 200 receives the altitude information from other devices.

(3) Altitude Zone Setting Information

The base station 100 (for example, the notification unit 153) notifies the drone 200 of altitude zone setting information.

The altitude zone setting information is information for setting an altitude zone for classifying a state of the altitude of the drone 200. The drone 200 can determine an altitude zone to which the drone 200 belongs on the basis of relationship between the acquired altitude information and the altitude zone setting information. Note that, because the set altitude zone corresponds to the above-described regulations, the altitude zone setting information can differ depending on countries or areas.

The altitude zone setting information includes at least setting regarding an altitude zone in which high-speed flight is possible (for example, the air space 22 illustrated in FIG. 2, the high-speed flight altitude zone 31 illustrated in FIG. 5 or FIG. 6). In addition, the altitude zone setting information can include setting regarding various kinds of altitude zones such as an altitude zone in which low-speed flight is possible (for example, the air space 21 illustrated in FIG. 2).

The altitude zone setting information includes thresholds for specifying the altitude zone, such as, for example, upper limit altitude $H_1$ and lower limit altitude $H_2$ of the altitude zone. Then, the drone 200 determines relationship between the altitude information and the altitude zone setting information on the basis of these thresholds. For example, the drone 200 determines that the altitude falls within the high-speed flight altitude zone if the altitude of the drone 200 indicated by the altitude information is equal to or higher than $H_1$ and equal to or lower than $H_2$ and, otherwise, determines that the altitude does not fall within the high-speed flight altitude zone on the basis of the altitude zone setting information regarding the high-speed flight altitude zone.

The altitude zone setting information may further include a value $H_M$ for providing a margin (that is, offset) to the thresholds for specifying the altitude zone. In the case where the altitude zone setting information includes the margin the drone 200 determines the altitude zone to which the drone 200 belongs while also taking into account the margin $H_M$ along with the upper limit altitude $H_1$ and the lower limit altitude $H_2$.

The drone 200 may determine relationship between the altitude information and the altitude zone setting information while a hysteresis is provided. That is, the drone 200 may provide a hysteresis to transition of the altitude zone to which the drone 200 belongs. Specifically, the drone 200 determines that the drone 200 belongs to the altitude zone after movement in the case where the drone 200 moves to a different altitude zone and flies in the altitude zone after movement for equal to or longer than a predetermined time period. In other words, even if the drone 200 moves to a different altitude zone, the drone 200 determines that the drone 200 belongs to the original altitude zone until the drone 200 flies in the altitude zone after movement for equal to or longer than the predetermined time period. By this means, it is possible to suppress excessively frequent transition of the altitude zone which can occur by the drone 200 flies near the boundary of the altitude zones. The altitude zone setting information may include a tinier value which provides the above-described predetermined time period for this hysteresis. The drone 200 determines that there is change in the altitude zone in the case where the changed altitude zone is maintained for a period exceeding the timer value included in the altitude zone setting information.

There can be various notification methods of the altitude zone setting information. For example, the base station 100 may make a notification of the altitude zone setting information included in system information (for example, a master information block (MIB) or a system information block (SIB)). Further, the base station 100 may make a notification of the altitude zone setting information included in information which is individually provided for each drone 200, such as a measurement configuration information element (IE) provided in the RRC connection reconfiguration message.

Further, the altitude zone setting information may include information indicating a value to be set or may include information indicating a changed value from current setting.

Note that the altitude zone setting information may be set at the drone 200 in advance.

(4) Measurement Report

The drone 200 (for example, the measurement report control unit 253) controls measurement report processing on the basis of relationship between the acquired altitude information and altitude zone setting information.

Specifically, the drone 200 uses a parameter in accordance with the relationship between the altitude information and the altitude zone setting information in the measurement report processing. By this means, the drone 200 can recognize or predict in advance transition of the altitude zone and reflect the transition on the measurement report processing, so that the drone 200 can perform appropriate hand-over in association with the reflection.

For example, in the case where the altitude zone set by the altitude zone setting information includes altitude indicated by the altitude information, the drone 200 controls the measurement report processing using the parameter in accordance with the altitude zone. That is, the drone 200 controls the measurement report processing using the parameter in accordance with the altitude zone to which the drone 200 belongs, in addition, in the case where a difference between an upper limit or a lower limit of the altitude zone set by the altitude zone setting information and the altitude information is within a threshold, the drone 200 may control the measurement report processing using the parameter in accordance with the altitude zone. For example, the drone 200 may control the measurement report processing using a parameter in accordance with an adjacent altitude zone to which the drone 200 comes close within an offset (that is the margin $H_M$) even if the drone 200 does not actually belong to the adjacent altitude zone. By this means, the drone 200 can use the parameter of the altitude zone to which it is predicted that the drone 200 belongs in near feature, ahead. Further, the drone 200 may control the measurement report processing using a parameter in accordance with that the drone 200 is located at the boundary of the altitude zones in the case where the drone 200 comes close to the adjacent altitude zone within an offset (that is, the margin $H_M$). By this means, in the case where the drone 200 flies near the boundary of the altitude zones, the drone 200 can, for example, exceptionally increase measurement frequency and reporting frequency.

Here, the measurement report processing to be controlled can include measurement of a reference signal transmitted from the base station 100 and reporting of a measurement report message including the reference signal information indicating a measurement result to the base station 100. This reporting is performed also in related art to perform hand-over. Further, the measurement report processing to be controlled can include measurement of altitude and reporting of a measurement report message including the altitude information indicating a measurement result to the base station 100. The measurement report message to be transmitted to the base station 100 may include the reference signal information and the altitude information or may include one of the reference signal information and the altitude information.

There are two types of control of the measurement report processing in accordance with the relationship between the altitude information and the altitude zone setting information, that is, control of a measurement timing and control of a report timing. These will be respectively described below.

Measurement Timing

The drone 200 (for example, the measurement report control unit 253) may cause the altitude to be measured at a timing based on a parameter in accordance with the relationship between the altitude information and the altitude zone setting information. For example, the drone 200 causes the altitude to be measured at a timing based on a parameter (such as, for example, an h-scale which will be described later) in accordance with the altitude zone to which the drone 200 belongs, the adjacent altitude zone to which the drone 200 comes close within an offset or the boundary of the altitude zones. By this means, the drone 200 can, for example, increase measurement frequency as the altitude is higher or increase measurement frequency of the altitude near the boundary of the high-speed flight altitude zone, or the like, to contribute to judgement of hand-over by the base station 100. Note that the measurement accuracy can increase as the measurement frequency increases.

The base station 100 notifies the drone 200 of altitude measurement timing setting information including the parameter regarding the measurement timing of the altitude. Then, the drone 200 measures the altitude at a timing based on the altitude measurement timing setting information. The altitude setting timing setting information may be included in, for example, the measurement configuration IE provided in the RRC connection reconfiguration message and notified.

For example, the altitude measurement timing setting information includes a parameter regarding a measurement pattern, such as a measurement period and an offset value of the measurement timing. An example of a specific parameter and setting of the measurement timing based on the parameter will be described below. For example, it is assumed that a scaling parameter of the measurement period is an h-scale, the parameter of the measurement period is an h-period and to measurement offset parameter is an h-offset. In this case, the drone 200 measures the altitude at a timing of a subframe of a system frame number (SFN) calculated with the following equations.

[Math. 1]
$$\text{SFN mod } T = \text{FLOOR}(h\text{-offset}) \quad (1)$$

[Math. 2]
$$\text{subframe} = h\text{-offset mod } 10 \quad (2)$$

[Math. 3]
$$T = \text{FLOOR}(h\text{-period}/h\text{-scale}) \quad (3)$$

According to the above-described equations, the measurement timing of the altitude comes with a period obtained by scaling the h-period with the h-scale, and becomes a timing of the SFN at which a residue obtained by dividing a value of the SFN with the period becomes equal to the h-offset. More specifically, the measurement timing of the altitude becomes a timing of a subframe determined with reference to a value of the last digit of the h-offset in the above-described frame period of the SFN.

Note that the altitude measurement timing setting information may include a parameter to be set itself or may include an amount of change from current setting.

Further, the reference signal may be measured at a timing in accordance with the measurement timing of the altitude.

Report Timing

The drone 200 (for example, the measurement report control unit 253) may report the measurement report message to the base station 100 at a timing based on the parameter in accordance with the relationship between the altitude information and the altitude zone setting information. For example, the drone 200 reports the measurement report message at a timing based on the parameter (such as, for example, an s-measure which will be described later) in accordance with the altitude zone to which the drone 200 belongs, the adjacent altitude zone to which the drone 200 comes close within an offset or the boundary of the altitude zones. By this means, the drone 200 can increase reporting frequency, for example, near the boundary of the high-speed flight altitude zone, or the like, to contribute to judgement of hand-over by the base station 100.

The base station 100 notifies the drone 200 of the report timing setting information including the parameter regarding the report timing of the altitude information. The drone 200 then reports the altitude information at a timing based on the report timing setting information. The report timing setting information may be included in, for example, the measurement configuration IE provided in the RRC connection reconfiguration message and notified.

Note that the report timing in LTE in related art is a timing at which events A1 to A6, or the like, occur, and parameters regarding the events A1 to A6 are provided from the base station as the measurement configuration IE (for example, ReportConfig). In the present embodiment, in addition to these parameters, the parameter regarding the altitude information is included in the measurement configuration IE, and notified. Further, a new event regarding the altitude information may be defined.

An example of information included in the report timing setting information will be described below For example, the report timing setting information may include information indicating report conditions regarding measurement report of the reference signal. Specifically, the report timing setting information may include the s-measure. The s-measure is one of parameters defining a timing of measurement report in LTE, and is a threshold corresponding to quality (for example, RSRP) of the reference signal of a primary cell (PCell). In the case where the s-measure is included in the report timing setting information, the drone 200 updates the s-measure set at the drone 200. By this means, the drone 200 changes a transmission timing of the measurement report message.

Note that the report timing setting information may include an s-measure suitable for the drone 200 separately from an s-measure suitable for the terminal device 300. Alternatively, the report timing setting information may include an offset value indicating a difference between an s-measure suitable for the terminal device 300 and an s-measure suitable for the drone 200.

Further, the report timing setting information may include a scaling factor for scaling the s-measure.

For example, the report timing setting information may include information indicating reporting conditions regarding the altitude information. Specifically, the report timing setting information may include a threshold corresponding to the altitude information. In the case where the report timing setting information includes a threshold corresponding to the altitude information, the drone 200 transmits the measurement report message at a timing at which the altitude indicated by the altitude information exceeds or falls below the threshold. In this manner, the drone 200 can transmit the measurement report message in accordance with the altitude information.

For example, the report timing setting information may include information indicating waiting time (for example, time-to-trigger (TTT)) from when the reporting conditions are satisfied until when the measurement report message is transmitted. In the case where the report timing setting information includes information indicating the waiting time, the drone 200 transmits the measurement report message after the waiting time has elapsed since the reporting conditions have been satisfied. Note that the report timing setting information may include a scaling factor for scaling the waiting time.

Note that the report timing setting information may include a parameter to be set itself or may include an amount of change from current setting.

(5) Referring of Speed

The drone 200 (for example, the measurement report control unit 253) may control the measurement report processing further on the basis of speed information indicating speed of the drone 200. The speed information to be referred to for controlling the measurement report processing may be information indicating speed in a vertical direction such as climbing speed and descent speed. In this case, the drone 200 can recognize with higher accuracy or predict in advance transition of the altitude zone and reflect the transition in the measurement report processing, so that the drone 200 can perform appropriate hand-over in association with the reflection. In addition, the speed information to be referred to for controlling the measurement report processing may be information indicating speed in a 3-dimensional direction as well as a vertical direction. In this case, the drone 200 can recognize or predict in advance positional relationship with the cell range in the 3-dimensional direction and reflect the positional relationship in the measurement report processing, so that the drone 200 can perform appropriate hand-over in association with the reflection.

To achieve this, first, the drone 200 (for example, the acquiring unit 251) acquires speed information indicating a measurement result of the speed. For example, the speed information can be measured by the sensor unit 243. That is, the drone 200 can acquire the speed information from the flight device 240. There can be various methods for measuring the speed information. For example, the speed information may be calculated on the basis of acceleration measured by an acceleration sensor. Further, the speed information may be calculated on the basis of temporal change of the altitude indicated by the altitude information.

The drone 200 may further improve accuracy of the speed information by combining two or more of these measurement methods. Further, the drone 200 may further improve accuracy of the speed information by correcting the measured speed information using correction data transmitted from the base station 100.

In addition, the speed information may be measured by other devices. For example, the speed information may be measured by another drone 200 which flies near the drone 200. Further, the speed information may be calculated by the base station 100 on the basis of temporal change of the altitude indicated by the altitude information. In these cases, the drone 200 receives the speed information from other devices.

Control of the measurement report processing in accordance with the speed information includes control of the measurement timing and control of the report timing in a similar manner to the control based on the altitude information.

Measurement Timing

The drone 200 (for example, the measurement report control unit 253) may cause the altitude to be measured at a timing based on a parameter in accordance with the speed information. By this means, the drone 200 can, for example, increase measurement frequency of the altitude as the speed is faster to contribute to judgement of hand-over by the base station 100.

In this case, the altitude measurement timing setting information notified from the base station 100 to the drone 200 includes a parameter regarding the speed information. By this means, the measurement timing of the altitude becomes a timing based on the parameter regarding the speed information. For example, the drone 200 measures the altitude at a timing at which the speed indicated by the speed information exceeds or falls below a threshold. Further, the drone 200 may control a measurement period in accordance with the speed information or may scale the measurement period.

Report Timing

The drone 200 (for example, the measurement report control unit 253) may report the measurement report message to the base station 100 at a timing based on the parameter in accordance with the speed information. By this means, the drone 200 can, for example, increase reporting frequency as the speed is faster to contribute to judgment of hand-over by the base station 100.

In this case, the report timing setting information notified from the base station 100 to the drone 200 includes a parameter regarding the speed information. By this means, the report timing becomes a timing based on the parameter regarding the speed information. For example, the drone 200 transmits the measurement report message at a timing at which the speed indicated by the speed information exceeds or falls below a threshold. Further, the drone 200 may control a report period in accordance with the speed information or may scale the report period.

Of course, the measurement report processing may be controlled on the basis of combination of the altitude information and the speed information. Further, the measurement report message may include the speed information.

(6) Terminal Attribute Information

The drone 200 (for example, the measurement report control unit 253) notifies the base station 100 of information indicating that processing in accordance with the relationship between the altitude information and the altitude zone setting information is performed. More simply, the drone 200 notifies the base station 100 of information indicating whether or not the drone 200 has flight ability, that is, information indicating whether or not the drone 200 is a drone. This information will be also referred to as terminal attribute information (corresponding to UE capability information in LTE) in the following description.

The base station 100 can recognize that the drone 200 is a drone from the terminal attribute information and make a notification of information for a drone (such as, for example, the altitude zone setting information, the altitude measurement timing setting information and the report timing setting information). Note that the base station 100 may notify the drone 200 of an inquiry message for requesting the drone 200 to make a notification of the terminal attribute information.

(7) Measurement Report Message

The drone 200 reports the measurement report message to the base station 100. This measurement report message includes at least one of the reference signal information or the altitude information. Typically, the measurement report message includes both the reference signal information and the altitude information. Further, the measurement report message may include the speed information.

The measurement report message includes a measurement result IE corresponding to a measurement ID of a report target. Note that the measurement ID is identification information associated with reference signal measurement process or altitude measurement process.

There is a case where a period of the altitude measurement timing is different from a period of the report timing. Therefore, for example, the measurement report message may include a plurality of pieces of altitude information or an average value of the plurality of pieces of altitude information. Further, the number of pieces of the altitude information to be reported may be limited to a predetermined number immediately before reporting, or a predetermined number of pieces of altitude information or an average value of a predetermined number of pieces of altitude information may be reported.

(8) Hand-Over

The base station 100 (for example, the hand-over control unit 155) controls hand-over processing in accordance with the measurement report message reported from the drone 200. For example, the base station 100 judges whether or not hand-over can be executed on the basis of at least one of the altitude information, the speed information or the reference signal information included in the measurement report message reported from the drone 200 and selects a target base station. The base station 100 transmits a hand-over request to the target base station in the case where hand-over is executed.

(9) Processing Flow

Processing flow in the present embodiment will be subsequently described with reference to FIG. 10 and FIG. 11.

Figure 10:
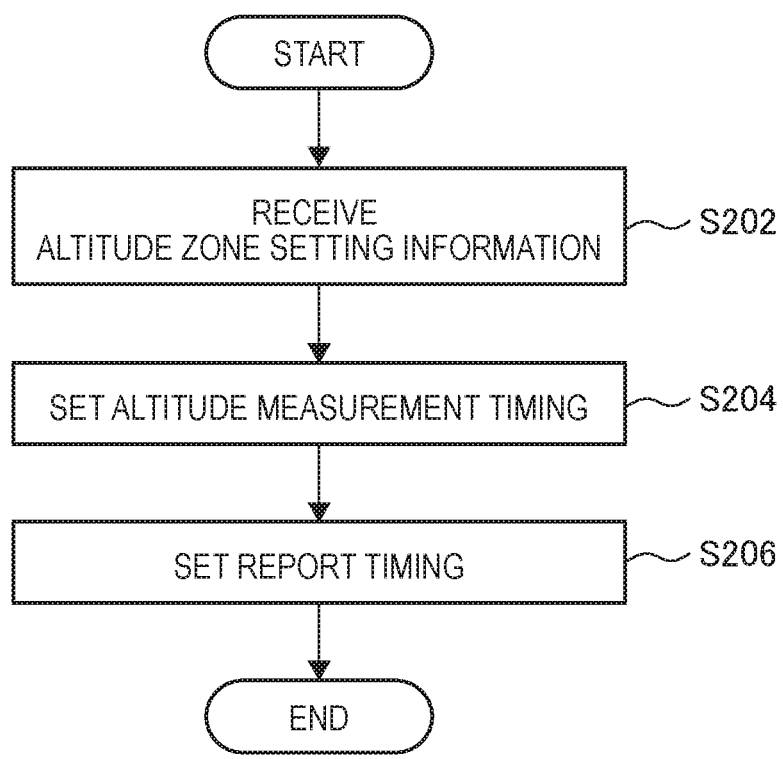
FIG. 10 is a flowchart illustrating an example of flow of measurement report processing executed at the drone according to the present embodiment.

FIG. 10 is a flowchart illustrating an example of flow of the measurement report processing executed at the drone 200 according to the present embodiment. As illustrated in FIG. 10, first, the drone 200 receives the altitude zone setting information from the base station 100 (step S202). Then, the drone 200 sets the altitude measurement timing on the basis of the relationship between the altitude information and the altitude zone setting information (step S204). Then, the drone 200 sets the report timing on the basis of the relationship between the altitude information and the altitude zone setting information (step S206). Thereafter, the drone 200 measures the altitude in accordance with the set altitude measurement timing and reports the measurement report message in accordance with the set report timing.

Figure 11:
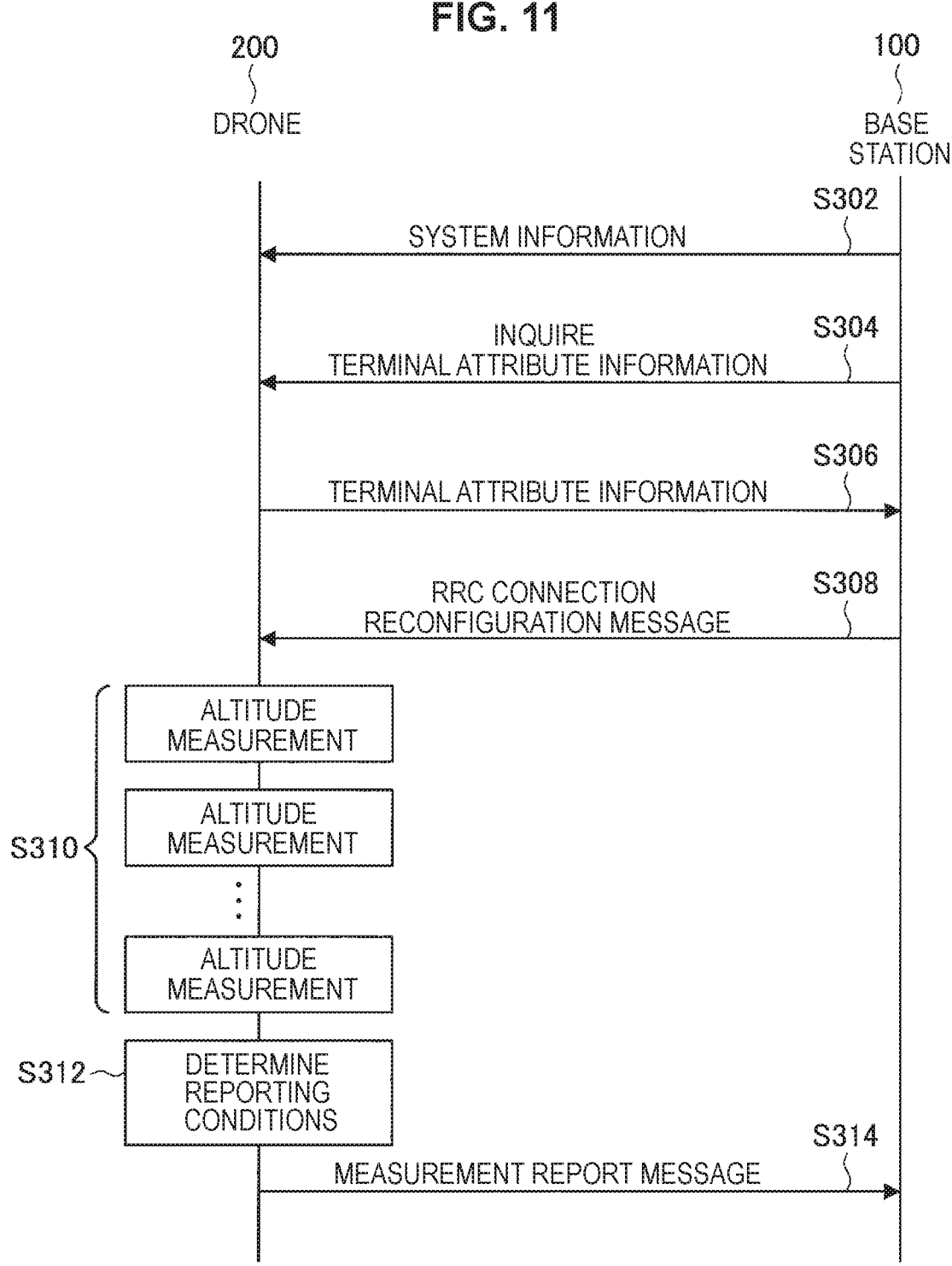
FIG. 11 is a sequence diagram illustrating an example of flow of measurement report processing performed in the system according to the present embodiment.

FIG. 11 is a sequence diagram illustrating an example of flow of the measurement report processing executed in the system 1 according to the present embodiment. The base station 100 and the drone 200 are involved with the present sequence.

As illustrated in FIG. 11, the drone 200 acquires system information from the base station 100 when the drone 200 camps on (step S302). This system information includes, for example, the altitude zone setting information.

Then, the base station 100 inquires the terminal attribute information to the drone 200 (step S304), and the drone 200 transmits the terminal attribute information to the base station 100 (step S306). By this means, the base station 100 recognizes that the communication partner is a drone.

Then, the base station 100 transmits, for example, the RRC connection reconfiguration message including the altitude measurement timing setting information and the report timing setting information to the drone 200 (step S308). More specifically, the base station 100 transmits a parameter for setting the measurement timing of the altitude and the report timing in accordance with the relationship between the altitude information and the altitude zone setting information to the drone 200.

Then, the drone 200 measures the altitude at a timing in accordance with the altitude measurement timing setting information, that is, at a timing based on the parameter in accordance with the relationship between the altitude information and the altitude zone setting information (step S310).

Then, the drone 200 performs reporting at a timing in accordance with the report timing setting information. For example, the drone 200 determines reporting conditions (step S312). More specifically, the drone 200 determines whether or not the timing to be determined (for example, current time) is a timing based on the parameter in accordance with the relationship between the altitude information and the altitude zone setting information. Then, in the case where it is determined that the reporting conditions are satisfied, the drone 200 reports the measurement report message including the reference signal information and the altitude information to the base station 100 (step S314).

4. APPLICATION EXAMPLES

The technology according to the present disclosure can be applied to various products. For example, the base station 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals to be described below may operate as the base station 100 by performing a base station function temporarily or semi-permanently.

<4.1. Application Examples for Base Station>

(First Application Example)

Figure 12:
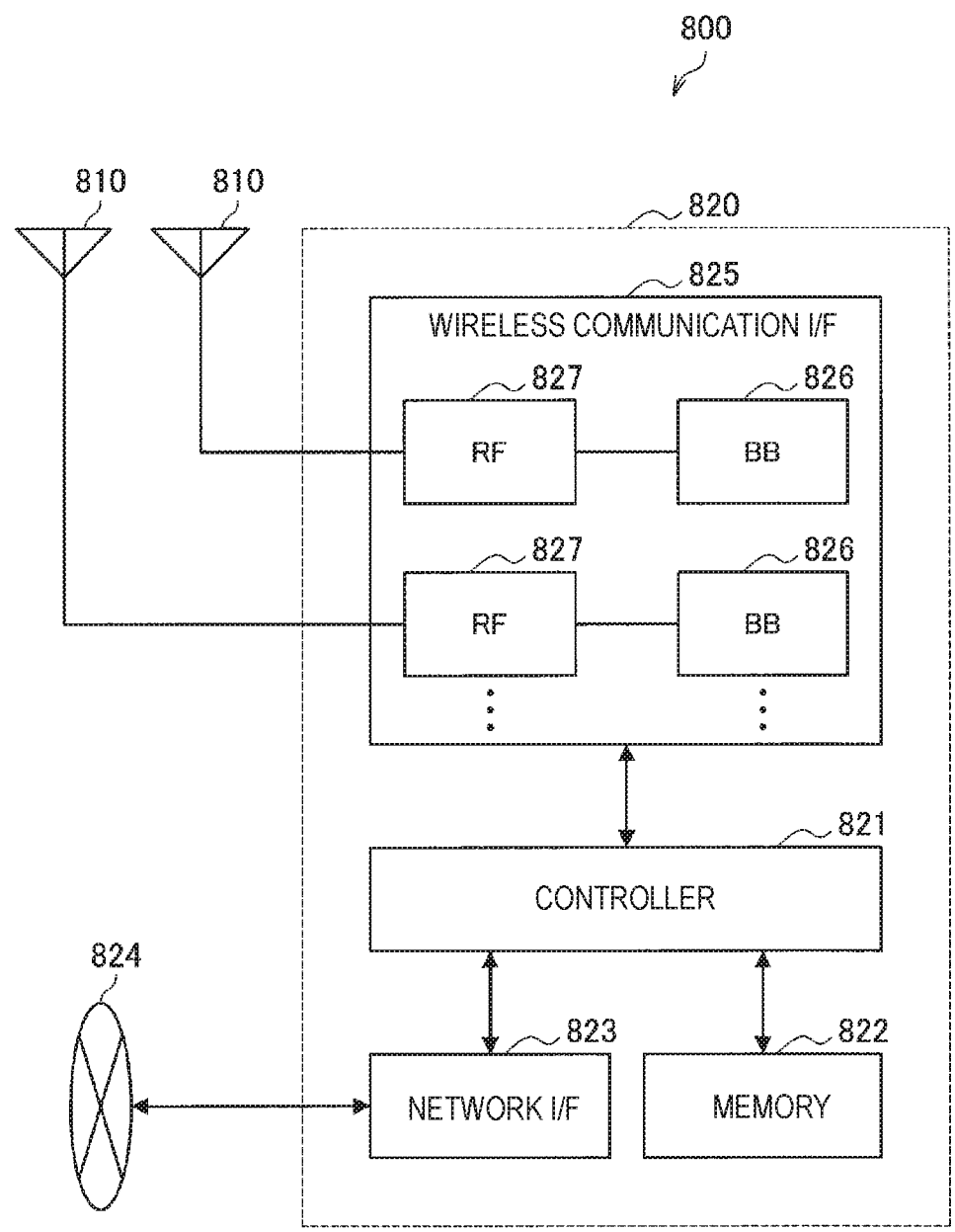
FIG. 12 is a block diagram illustrating a first example of a schematic configuration of an eNB.

FIG. 12 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 12, and the plurality of antennas 810 may, for example, correspond to a plurality of frequency bands used by the eNB 800, it should be noted that while FIG. 12 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 12, and the plurality of BB processors 826 may, for example, correspond to a plurality of frequency bands used by the eNB 800. Further, the wireless communication interface 825 may also include a plurality of the RF circuits 827, as illustrated in FIG. 12, and the plurality of RF circuits 827 may, for example, correspond to a plurality of antenna elements. Note that FIG. 12 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 12, one or more constituent elements (for example, the reference signal transmitting unit 151, the notification unit 153, and/or the hand-over control unit 155) included in the processing unit 150 described with reference to FIG. 8 may be implemented in the wireless communication interface 825.

Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 12, the wireless communication unit 120 described with reference to FIG. 8 may be implemented in the wireless communication interface 825 (for example, the RF circuit 827). Further, the antenna unit 110 may be implemented at the antenna 810. Further, the network communication unit 130 may be implemented at the controller 821 and/or the network interface 823. Further, the storage unit 140 may be implemented at the memory 822.

(Second Application Example)

Figure 13:
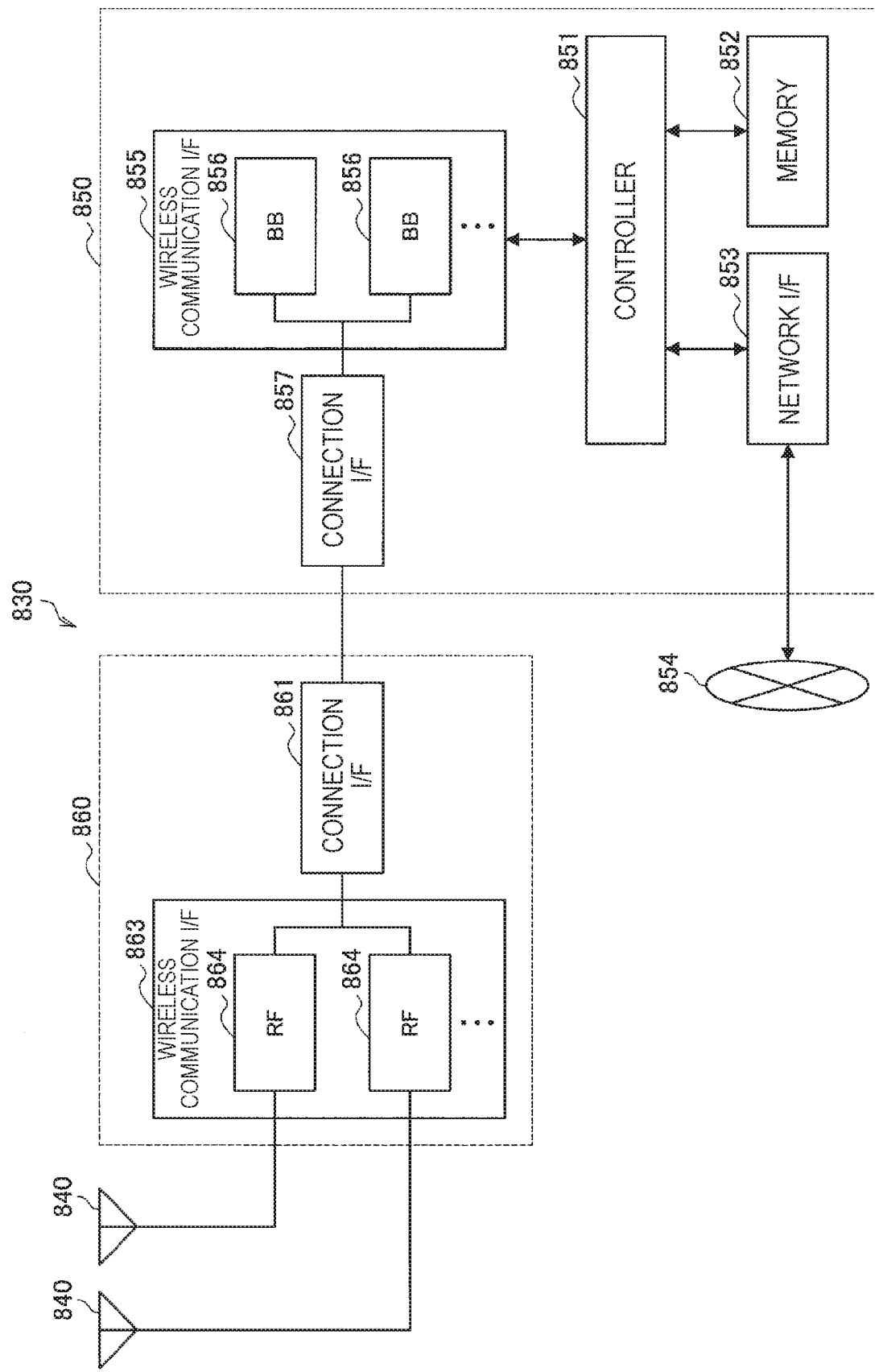
FIG. 13 is a block diagram illustrating a second example of the schematic configuration of the eNB.

FIG. 13 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 13, and the plurality of antennas 840 may, for example, correspond to a plurality of frequency bands used by the eNB 830. Note that FIG. 13 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 12.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 12 except that the BB processor 856 is connected to an RF circuit 864 of the RRH 860 via the connection interface 857. The wireless communication interface 855 may include a plurality of the BB processors 856, as illustrated in FIG. 13, and the plurality of BB processors 856 may, for example, correspond to a plurality of frequency bands used by the eNB 830. Note that FIG. 13 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 13, and the plurality of RF circuits 864 may, for example, correspond to a plurality of antenna elements. Note that FIG. 13 illustrates an example in which the wireless communication interface 863 includes the plurality of RF circuits 864, but the wireless communication interface 863 may include the single RF circuit 864.

In the eNB 830 illustrated in FIG. 13, one or more constituent elements (for example, the reference signal transmitting unit 151, the notification unit 153, and/or the hand-over control unit 155) included in the processing unit 150 described with reference to FIG. 8 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 825 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 13, for example, the wireless communication unit 120 described with reference to FIG. 8 may be implemented in the wireless communication interface 863 (for example, the RF circuit 864). Further, the antenna unit 110 may be implemented at the antenna 840. Further, the network communication unit 130 may be implemented at the controller 851 and/or the network interface 853. Further, the storage unit 140 may be implemented at the memory 852.

5. CONCLUSION

An embodiment of the present disclosure has been described in detail above with reference to FIG. 1 to FIG. 13. As described above, the drone 200 according to the present embodiment acquires the altitude information indicating a measurement result of the altitude and controls the measurement report processing of reporting the measurement report message including the reference signal information indicating a measurement result of the reference signal transmitted from the base station 100 and the altitude information to the base station 100 on the basis of the relationship between the altitude information and the altitude zone setting information. By this means, the base station 100 can grasp the altitude of the drone 200 and cause the drone 200 to appropriately execute hand-over. In association with this, because failures of hand-over by the drone 200 are reduced, hand-over becomes efficient. As a result, an operator can realize accommodation of a number of drones 200 using small cells.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while description has been provided that the drone 200 is notified of the altitude zone setting information, the altitude measurement timing setting information and the report timing setting information from the base station 100, a source provider of the information is not limited to the base station 100. For example, the information may be provided from a server on the Internet, and the drone 200 may be notified of the information by way of the base station 100.

Further, the drone 200 is not limited to a drone in a narrow sense. For example, the drone 200 may be an arbitrary flight vehicle controlled via cellular communication.

Further, while description has been provided above mainly concerning the high-speed flight altitude zone, the present technology is not limited to such an example. For example, the present technology may be applied to other altitude zones such as a low-speed flight altitude zone.

Further, the processing described using the flowcharts and the sequence diagrams in the present specification does not necessarily have to be executed in the illustrated order. Some processing steps may be executed in parallel. Further, additional processing steps may be employed, or part of the processing steps may be skipped.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1)

A circuit including:

an acquiring unit configured to acquire altitude information indicating a measurement result of altitude; and a measurement report control unit configured to control measurement report processing of reporting a measurement report message including reference signal information indicating a measurement result of a reference signal transmitted from a base station and the altitude information to the base station on the basis of relationship between the altitude information acquired by the acquiring unit and altitude zone setting information.

(2)

The circuit according to (1), in which, in a case where an altitude zone set by the altitude zone setting information includes altitude indicated by the altitude information or in a case where a difference between an upper limit or a lower limit of the altitude zone set by the altitude zone setting information and the altitude indicated by the altitude information is within a threshold, the measurement report control unit controls the measurement report processing using a parameter in accordance with the altitude zone.

(3)
The circuit according to (1) or (2),
in which the measurement report control unit causes altitude to be measured at a timing based on a parameter in accordance with the relationship.

(4)
The circuit according to any one of (1) to (3),
in which the measurement report control unit reports the measurement report message to the base station at a timing based on a parameter in accordance with the relationship.

(5)
The circuit according to any one of (1) to (4),
in which the acquiring unit acquires speed information, and
the measurement report control unit controls the measurement report processing further on the basis of the speed information.

(6)
The circuit according to (5),
in which the measurement report control unit causes altitude to be measured
at a timing based on a parameter in accordance with the speed information.

(7)
The circuit according to (5) or (6),
in which the measurement report control unit reports the measurement report message to the base station at a timing based on a parameter in accordance with the speed information.

(8)
The circuit according to any one of (5) to (7),
in which the speed information is information indicating speed in a vertical direction.

(9)
The circuit according to any one of (1) to (8),
in which the measurement report control unit notifies the base station of information indicating that processing in accordance with the relationship is performed.

(10)
The circuit according to any one of (1) to (9).
in which the measurement report control unit determines the relationship while a hysteresis is provided.

(11)
The circuit according to any one of (1) to (10),
in which the altitude zone setting information includes at least setting regarding an altitude zone at which high-speed flight is possible.

(12)
The circuit according to any one of (1) to (11), in which the acquiring unit acquires the altitude information from a flight device which is capable of flying.

(13)
The circuit according to (12),
in which the circuit is connected to the flight device.

(14)
A base station including:
a reference signal transmitting unit configured to transmit a reference signal; and
a notification unit configured to notify a terminal device of altitude zone setting information, the terminal device controlling measurement report processing of reporting a measurement report message including reference signal information indicating a measurement result of the reference signal and altitude information on the basis of relationship between the altitude information indicating a measurement result of altitude and the altitude zone setting information.

(15)
The base station according to (14),
in which the notification unit makes a notification of the altitude zone setting information included in system information or a radio resource control (RRC) connection reconfiguration message.

(16)
The base station according to (14) or (15), further including:
a hand-over control unit configured to control hand-over processing in accordance with the measurement report message reported from the terminal device.

(17)
A method including:
acquiring altitude information indicating a measurement result of altitude; and
controlling, by a processor, measurement report processing of reporting a measurement report message including reference signal information indicating a measurement result of a reference signal transmitted from a base station and the altitude information to the base station on the basis of relationship between the acquired altitude information and altitude zone setting information.

(18)
A method including:
transmitting a reference signal; and
notifying, by a processor, a terminal device of altitude zone setting information, the terminal device controlling measurement report processing of reporting a measurement report message including reference signal information indicating a measurement result of the reference signal and altitude information on the basis of relationship between the altitude information indicating a measurement result of altitude and the altitude zone setting information.

(19)
A recording medium having a program recorded thereon, the program causing a computer to function as:
an acquiring unit configured to acquire altitude information indicating a measurement result of altitude; and
a measurement report control unit configured to control measurement report processing of reporting a measurement report message including reference signal information indicating a measurement result of a reference signal transmitted from a base station and the altitude information to the base station on the basis of relationship between the altitude information acquired by the acquiring unit and altitude zone setting information.

(20)
A recording medium having a program recorded thereon, the program causing a computer to function as:
a reference signal transmitting unit configured to transmit a reference signal; and
a notification unit configured to notify a terminal device of altitude zone setting information, the terminal device controlling measurement report processing of reporting a measurement report message including reference signal information indicating a measurement result of the reference signal and altitude information on the basis of relationship between the altitude information indicating a measurement result of altitude and the altitude zone setting information.

REFERENCE SIGNS LIST 1 system
31 high-speed flight altitude zone
100 base station
110 antenna unit
120 wireless communication unit
130 network communication unit
140 storage unit
150 processing unit
151 reference signal transmitting unit
153 notification unit
155 hand-over control unit
200 terminal device drone
210 antenna unit
220 wireless communication unit
230 storage unit
240 flight device
241 driving unit
242 battery unit
243 sensor unit
244 flight control unit
250 processing unit
251 acquiring unit
253 measurement report control unit
300 terminal device

The invention claimed is:

1. Circuitry for an aerial vehicle, comprising: processing circuitry configured to
acquire altitude information indicating a measurement result of altitude of the aerial vehicle;
receive a reference signal transmitted from a base station;
receive altitude zone setting information transmitted from the base station, the altitude zone setting information being information for setting an altitude zone for classifying a state of the altitude zone of the aerial vehicle;
identify the altitude zone of the aerial vehicle based on the altitude information and the altitude zone setting information; and
control measurement report processing of reporting a measurement report message, including reference signal information indicating a measurement result of the reference signal and the altitude information, to the base station based on the identified altitude zone of the aerial vehicle, such that a frequency of transmitting the measurement report message is changed according to the identified altitude zone of the aerial vehicle.

2. The circuitry according to claim 1,
wherein, in a case where an altitude zone set by the altitude zone setting information includes altitude indicated by the altitude information or in a case where a difference between an upper limit or a lower limit of the altitude zone set by the altitude zone setting information and the altitude indicated by the altitude information is within a threshold, the processing circuitry controls the measurement report processing using a parameter in accordance with the altitude zone.

3. The circuitry according to claim 1,
wherein the processing circuitry causes altitude to be measured at a timing based on a parameter in accordance with the identified altitude zone of the aerial vehicle.

4. The circuitry according to claim 1,
wherein the processing circuitry reports the measurement report message to the base station at a timing based on a parameter in accordance with the identified altitude zone of the aerial vehicle.

5. The circuitry according to claim 1, wherein
the processing circuitry acquires speed information indicating a speed of the aerial vehicle, and
the processing circuitry controls the measurement report processing further on a basis of the speed information.

6. The circuitry according to claim 5,
wherein the processing circuitry causes altitude to be measured at a timing based on a parameter in accordance with the speed information.

7. The circuitry according to claim 5,
wherein the processing circuitry reports the measurement report message to the base station at a timing based on a parameter in accordance with the speed information.

8. The circuitry according to claim 5,
wherein the speed information is information indicating speed in a vertical direction of the aerial vehicle.

9. The circuitry according to claim 5,
wherein the processing circuitry notifies the base station of information indicating that processing in accordance with the identified altitude zone of the aerial vehicle is performed.

10. The circuitry according to claim 1,
wherein the processing circuitry determines the identified altitude zone of the aerial vehicle while a hysteresis is provided.

11. The circuitry according to claim 1,
wherein the altitude zone setting information includes at least setting regarding an altitude zone at which high-speed flight higher than a predetermined threshold speed is possible.

12. The circuitry according to claim 1,
wherein the processing circuitry acquires the altitude information from the aerial vehicle.

13. The circuitry according to claim 12,
wherein the processing circuitry is connected to the aerial vehicle.

14. The circuitry according to claim 1, wherein
the aerial vehicle is an unmanned aerial vehicle.

15. The circuitry according to claim 1, wherein
the processing circuitry is configured to change the frequency of transmitting the measurement report message such that the frequency is higher as the identified altitude zone of the aerial vehicle becomes higher.

16. The circuitry according to claim 1, wherein
the processing circuitry is configured to change a frequency of measuring the altitude of the aerial vehicle according to the identified altitude zone of the aerial vehicle.

17. The circuitry according to claim 1, wherein
the processing circuitry is configured to change the frequency of measuring the altitude of the aerial vehicle such that the frequency of measuring the altitude of the aerial vehicle is higher as the identified altitude zone of the aerial vehicle becomes higher.

18. A method for an aerial vehicle, comprising:
acquiring altitude information indicating a measurement result of altitude of the aerial vehicle;
receiving a reference signal transmitted from a base station;
receiving altitude zone setting information transmitted from the base station, the altitude zone setting information being information for setting an altitude zone for classifying a state of the altitude zone of the aerial vehicle;
identifying the altitude zone of the aerial vehicle based on the altitude information and the altitude zone setting information; and controlling, using processing circuitry, measurement report processing of reporting a measurement report message, including reference signal information indicating a measurement result of the reference signal and the altitude information, to the base station based on the identified altitude zone of the aerial vehicle, such that a frequency of transmitting the measurement report message is changed according to the identified altitude zone of the aerial vehicle.

19. A non-transitory computer readable medium including executable instructions, which when executed by a computer cause the computer to execute a method for an aerial vehicle, the method comprising acquiring altitude information indicating a measurement result of altitude of the aerial vehicle;

receiving a reference signal transmitted from a base station;

receiving altitude zone setting information transmitted from the base station, the altitude zone setting information being information for setting an altitude zone for classifying a state of the altitude zone of the aerial vehicle;

identifying the altitude zone of the aerial vehicle based on the altitude information and the altitude zone setting information; and controlling measurement report processing of reporting a measurement report message, including reference signal information indicating a measurement result of the reference signal and the altitude information, to the base station based on the identified altitude zone of the aerial vehicle, such that a frequency of transmitting the measurement report message is changed according to the identified altitude zone of the aerial vehicle.

* * * * *